United States Patent [19]

Eden et al.

[11] Patent Number: 4,583,090

[45] Date of Patent: Apr. 15, 1986

[54] DATA COMMUNICATION SYSTEM

[75] Inventors: Richard C. Eden; Ira Deyhimy; Timothy J. Quilici, all of Thousand Oaks, Calif.

[73] Assignee: American Diversified Capital Corporation, Costa Mesa, Calif.

[21] Appl. No.: 312,367

[22] Filed: Oct. 16, 1981

[51] Int. Cl.⁴ .............................................. H04Q 9/00

[52] U.S. Cl. .......................... 340/825.07; 340/825.58; 340/825.69; 370/71

[58] Field of Search ...................... 340/825.06, 825.07, 340/825.52, 825.58, 825.22, 825.69; 375/11, 17, 19, 20, 42, 52, 53, 83, 85, 86, 45, 54, 62, 67; 370/71, 72, 74, 76, 11

[56] References Cited

U.S. PATENT DOCUMENTS

| | | | |
|---|---|---|---|
| 3,413,556 | 11/1968 | King | 325/320 |
| 3,643,160 | 2/1972 | Ray et al. | 325/3 |
| 3,842,249 | 10/1974 | Geyer et al. | 340/825.22 |
| 3,845,391 | 10/1974 | Crosby | 325/64 |
| 3,845,412 | 10/1974 | Rearwin et al. | 332/9 R |
| 3,929,407 | 2/1976 | Bickford | 325/47 |
| 3,946,243 | 3/1976 | Anderson et al. | 307/140 |
| 3,980,954 | 9/1976 | Whyte . | |
| 4,096,520 | 6/1978 | Furuta | 358/133 |
| 4,117,405 | 9/1978 | Martinez . | |
| 4,152,605 | 5/1979 | Conde et al. | 307/3 |
| 4,156,194 | 5/1979 | Mueller | 340/825.58 |
| 4,190,800 | 2/1980 | Kelly, Jr. et al. | 325/308 |
| 4,199,761 | 4/1980 | Whyte et al. | 340/825.52 |
| 4,247,786 | 1/1981 | Hedges | 307/35 |
| 4,302,750 | 11/1981 | Wadhwani et al. | 340/370 |
| 4,348,668 | 9/1982 | Gurr et al. | 340/825.06 |
| 4,352,992 | 10/1982 | Buenaegel et al. | 307/40 |
| 4,360,881 | 11/1982 | Martinson | 364/493 |
| 4,409,635 | 10/1983 | Krauss | 361/62 |

FOREIGN PATENT DOCUMENTS 2061581 5/1981 United Kingdom ........... 340/825.69

OTHER PUBLICATIONS

Thomas D. Smith, A Novel System for Managing Electrical Utility Loads, 7th IEEE/PES Transmission and Distribution Conference and Exposition (Apr. 1–6, 1979), pp. 594–599.

*Primary Examiner*—Donald J. Yusko
*Attorney, Agent, or Firm*—Finnegan, Henderson, Farabow, Garrett & Dunner

[57] ABSTRACT

A data communication system for general purposes having a new ternary carrier frequency shift keying (TCSK) signal. The system is applied to a utility load control by transmission of a sub-carrier of an FM broadcast channel. It is decoded by a receiver, SCA decoder, TCSK filter and a two level or binary converter and used to communicate to a pre-programmed microprocessor which enables various load control functions to be performed. The general system also is given for a QPSK (quadraphase shift keying) operating system.

A data transmission filter is split between the transmitter and receiver and is operated in cascade to give individual interference filtering at each end of the transmission while also providing combined action and wave shaping. A high accuracy FM decoder using zero crossing detection enables data recovery with simple circuits. A novel random time load restoration circuit for ramp-up is disclosed. A fail safe relay operator is also disclosed.

The TCSK employs a novel 19 character hex code format which is 8 bit microprocessor compatible and directly usable for other purposes such as ASCII message transmission. Both QPSK and TCSK systems offer command structures of variable length so as to permit truncation of message and reduce total message transmit time.

23 Claims, 43 Drawing Figures

ADDRESS RECOGNITION ROUTINE

ADDRESSING

TIMER FRACTION ACCUMULATOR

CYCLE TIMING

COMMAND FORMATS

PREAMBLE WAVEFORM

TIMING MEASUREMENTS

PREAMBLE CHIP EDGES

EXPANDED VIEW OF START OF PREAMBLE

DATA COMMUNICATION SYSTEM

BACKGROUND OF THE INVENTION

The present invention relates to a data communications system in which it is desired to communicate a computer-generated stream of binary data signals from a transmitting site to a receiving site or a plurality of receiving sites. Generally, such systems involve a computer which controls a signal transmission system and a receiving system employing a computer for decoding the data and rendering it in useful form for performing a function. This invention had its origin in the development of automatic control systems relating to the control of consumer loads in an electrical utility distribution network. Such networks employ control systems for automatically controlling the environmental conditions within buildings and for turning on and off electrical power consuming appliances in order to obtain utility control over the distribution and use of electrical power in the network. While such use is specific, the data communications system developed for this purpose will be found to be widely applicable and to possess many unique features which may be employed singularly or collectively in a wide variety of data communications purposes.

In general, the direct control of electrical loads has been practiced for many decades using various technologies. Since the inception of a significant public awareness in the limitations of energy as a resource and because of significant cost increases, considerable effort has been made to develop direct, utility-operated load management operational systems. The principal proposed use requires a communication channel from the utility to the consumer's location. This has required an effective means for transmitting a data signal over the channel as well as a simple and reliable receiver capable of decoding the signal and employing the result to control load function, e.g., for turning loads on and off. Even this relatively simple objective is difficult to achieve.

The use of power lines of a power line distribution network as a communication channel is limited in many ways, but proposals have been made to do so. The power line systems suffer from a hostile noise environment and considerable interference appearing on the power lines themselves. In addition, propagation losses from radiation and from power transformer blockage is significant. Proposals to independently transmit control signals, on a VHF FM carrier for example, are met with limitations due to limited spectrum availability and limited power as well. Telephone communications involve not only costly installation and dedication of lines, but are also subject to considerable uncertainty particularly while a power outage condition is occurring and maximum utility control reliability is required. Telephone switching systems are often overloaded at these times and cannot function reliably. Proposals for the use of a simultaneous non-interfering modulation of existing AM and FM broadcast radio stations have also been made.

The present invention is a complete description of an operable system utilizing existing FM allocations and radio station power by broadcasting a control channel as an encoded modulation on the supplemental communication authorization (SCA) portion of the channel. The transmission is capable of co-sharing the SCA channel with typical users, such as background music systems, without interfering with or limiting such co-channel user and without interfering with the FM stereocast transmission.

The information which may be transmitted is so great that virtually any load function can be controlled. Specifically, the present invention discloses an apparatus for shutting the power to a load device off completely by interposing an operable relay system of high power transmission capability between the load and the associated electrical source such as at the outlet of the circuit breaker system.

It is common in systems of this type to refer to the transmission of data from the utility via a communications channel to the user as communication in the forward link. Forward link communication comprehends load control by e.g., switching devices on and off, causing mass shut-down of loads, or selective restarting of loads to bring them back on-line after a power-out condition has been corrected. The reverse link seeks to make available communication from the user to the utility. This is used for obtaining meter readings remotely and for other condition performance like feedback from the user. However, the enormous difficulty in providing every user with a private communication channel or a shared channel, as well as the high cost of such transmitters coupled with the virtual unavailability of radio channels for such private use, renders reverse link communication generally impractical.

Accordingly, the present invention proposes a data communications system of such capability and reliability that reverse link communication is believed unwarranted and is not proposed. Such communication would be possible if desired, however.

Of the considerable patent art which pertains to this subject, the following patents are given only as examples of the art. U.S. Pat. No. 4,117,405 to Louis Martinez, issued Sept. 26, 1978, is an example of a proposal for using available AM broadcast radio stations as a communications channel. It is proposed in Martinez that modulation be used by varying the phase while maintaining sychronization between the transmitter and receiver using phase-lock loop circuits. Also, polling of receivers is disclosed for avoiding difficulties in the amount of information that can be transmitted over a narrow band channel.

Also known is U.S. Pat. No. 3,980,954 to Ian A. Whyte, entitled BIDIRECTIONAL COMMUNICATION SYSTEM FOR ELECTRICAL POWER NETWORKS, issued Sept. 14, 1976, which proposes using a frequency shift keyed audio tone transmission on the SCA channel of commercial FM broadcast transmitters.

The AM broadcast proposes an FM/phase modulation of the carrier frequency. FCC regulations, however, dictate that the instantaneous carrier frequency must be within $\pm 20$ Hz of the specified transmitter carrier frequency. This limits the peak frequency deviation to a few Hz such that the effective bandwidth is so narrow that the data rate is severely limited. The practical consequence of such limitations are that the capability of individual addressing on a large scale deployment will not be possible. For instance, to individually address even two million customers with a versatile compound structure and appropriate redundancy, a message length would have to be about 32 bits. It can be shown readily that in the AM case, even an efficient 1 bit per second per Hz encoding or 4 bit data rate per second would take about six months to address this number of customers. On the other hand, in an FM broadcast modulation approach, if the full SCA channel were utilized, where an available bandwidth might be 5,000 Hz, the required time to accomplish the same feat would be less than eight hours.

In addition to the foregoing, the AM systems proposed generally involve varying the phase or center frequency of the AM channel. Because this is proposed for AM stereo transmission, this data transmission approach appears to be incompatible with future AM stereo broadcast operations. In addition, AM transmission suffers from other difficulties relating to night time long distance propagation which causes interference from great distances over a valuable portion of the transmission time frame.

The proposal of U.S. Pat. No. 3,980,954 calls for transmission of a two tone FSK which would completely eliminate a co-channel SCA user, thus eliminating substantial transmission channel value. If an attempt is made to add a two tone signal in addition to SCA co-channel, significant intermodulation will occur in the left minus right stereo channel, i.e., at 53 Hz and below. In addition, any attempt to filter out the frequencies requires either that any co-channel use, background music for example, be reduced in bandwith to a point where it is unacceptable or that filters of extremely high quality be employed since the typical frequency proposed is so sensitive to the ear. The latter solution requires a retrofit of all existing user SCA receivers and is economically and practically unjustified.

There is, therefore, a need for a new and improved data communications system and particularly for such a system which is adaptable to a widespread co-channel use in commercial broadcasting for utility load control.

SUMMARY OF THE INVENTION AND OBJECTS

A general object of the present invention is to provide a data communications system which will overcome the above limitations and disadvantages.

A further object of the invention is to provide a data communications system which may be employed with existing FM broadcast transmitting stations for the purpose of permitting an additional co-channel use for consumer load control by electrical utilities.

A further object of the invention is to provide a ternary carrier shift keying (TCSK) communication system.

Another object of the invention is to provide a TCSK system which is especially adapted to wide scale use as a direct communication load control link.

Another object of the invention is to provide a quaternary phase-shift keying (QPSK) shift keying communication system particularly for load control applications.

Another object of the invention is to provide a communication system of the above character employing a variable length binary or ternary command system.

Another object of the invention is to provide a communication system of the above character in which logical group addressing is available as a command structure.

Another object of the invention is to provide a communication system of the above character capable of communicating in an extended hexadecimal symbol format consisting of 19 allowable characters, each composed of a sequence of four ternary chips represented by SCA frequency deviations, and meeting the constraint that the average SCA frequency be constant.

Another object of the invention is to provide a communication system of the above character having command operated variable threshhold detection of the received signals.

Another object of the invention is to provide a communication system particularly employing TCSK which is totally 8 bit microprocessor compatible and ASCII compatible.

Another object of the invention is to provide a communication system of the above character which is SCA compatible with concurrent users.

Another object of the invention is to provide a communication system of the above character having a message preamble which can be readily identified and decoded to establish a time sychronization between the transmitter and receiver at the start of every message.

Another object of the invention is to provide a communication system of the above character which provides ramp-up random load restoration over a period long enough to prevent utility system overload and based on a randomness feature of microprocessor clocks.

Another object of the invention is to provide for a transmitter control unit (TCU) for use in a communications system of the above character in which a computer may be dedicated for use at the transmitter and in which the TCU operation does not require a computer for its operation.

Another object of the invention is to provide communications system of the above character in which transmit and receive filtering is accomplished for different purposes but operate in cascade to achieve optimum waveform shape for data communication.

Another object of the invention is to provide a communication system of the above character employing a digital FM discriminator of inherently simple construction and which has as high a sensitivity as conventional PLL (phase-locked loop) detectors but is more linear and has wider bandwidth.

Another object of the invention is to provide a load control system of the above character.

Another object of the invention is to provide a load control system of the above character employing a receiver including a fail safe relay driver circuit which requires a continuously energized output from the control circuits or automatically shifts into a fail safe "ON" mode.

The foregoing general objectives have been achieved in accordance with the present invention by employing particular forms of modulation of the SCA carrier. The first calls for modulating an audio tone on the SCA channel by quadraphase shift keying while the second calls for directly frequency-shift modulating the SCA carrier itself with a ternary modulating signal pattern to achieve ternary carrier shift keying. The equivalent band pass signals are shown in FIGS. 1 and 2, respectively. The first system involving Quaternary-Phase or Quadraphase Shift Keying is hereinafter termed QPSK, while the second system involving Ternary Carrier Shift Keying is hereinafter termed TCSK.

Both systems have as their objective direct load control techniques both of commercial and industrial loads and of residential loads. As is known, such techniques involve peak shaving in order to selectively reduce demand of less critical users and shift such demand to time periods when the demand can be more easily met.

Power system optimization also involves load deferral to reduce or increase demand and system protection to effect immediately large reductions in demand to prevent short term overloading of the power utility system. Residential direct load control is used to cycle water heaters at appropriate times and intervals, to likewise cycle or operate space heating equipment such as air conditioners and resistance space heating, to program dual fuel heating systems, and to selectively reduce high power consuming demand devices during peak utility load. Commercial and industrial load control is used to override users' routine control and to limit temperature excursions to control cycling strategies and the like.

The present invention utilizes a baseline system which is incorporated and transmitted on a commercial FM SCA broadcast frequency and is received and decoded by a specially designed receiver to provide individually addressable communication links between the utility control center and all loads so equipped in the utility service territory. Selective consumer addressing is provided so that the loads may be individually addressed or addressed in units of such small numbers as to provide any desired selective communication. The structure and length of the message format is variable and selected by the control computer to provide sufficient length and complexity desired to accomplish the control protocol but the sufficiently short messages to be made in truncated form so that very rapid transmission rates can be obtained. This is accomplished using a special terminate symbol which at any point in the address portion of the message to truncate it. Thus, a unique address for the selected loads can be provided as for example to select by zone, sub-station, customer type, and geographical area the loads to be effected. By use of the terminate symbol, however, it is not necessary to transmit this full address in most messages. Another special symbol, a "DON'T CARE" or "WILDCARD" symbol, can be used within the transmitted portion of the address to obtain "Logical Group Addressing," such as to simultaneously address all loads of a specific customer type, regardless of their zone, substation, geographical area, etc.

The system employs the supplemental communication authorization of commercial FM broadcasts to provide 24-hour interference free coverage up to about 90–100 miles from the FM station and extendable by retransmission on FM station frequencies in the neighboring areas to provide a network capable of covering any service territory of a utility.

BRIEF DESCRIPTION OF THE DRAWINGS

FIGS. 28A–C are flow charts of a preamble synchronization sequence.

DETAILED DESCRIPTION OF THE PREFERRED EMBODIMENTS

Figure 4:
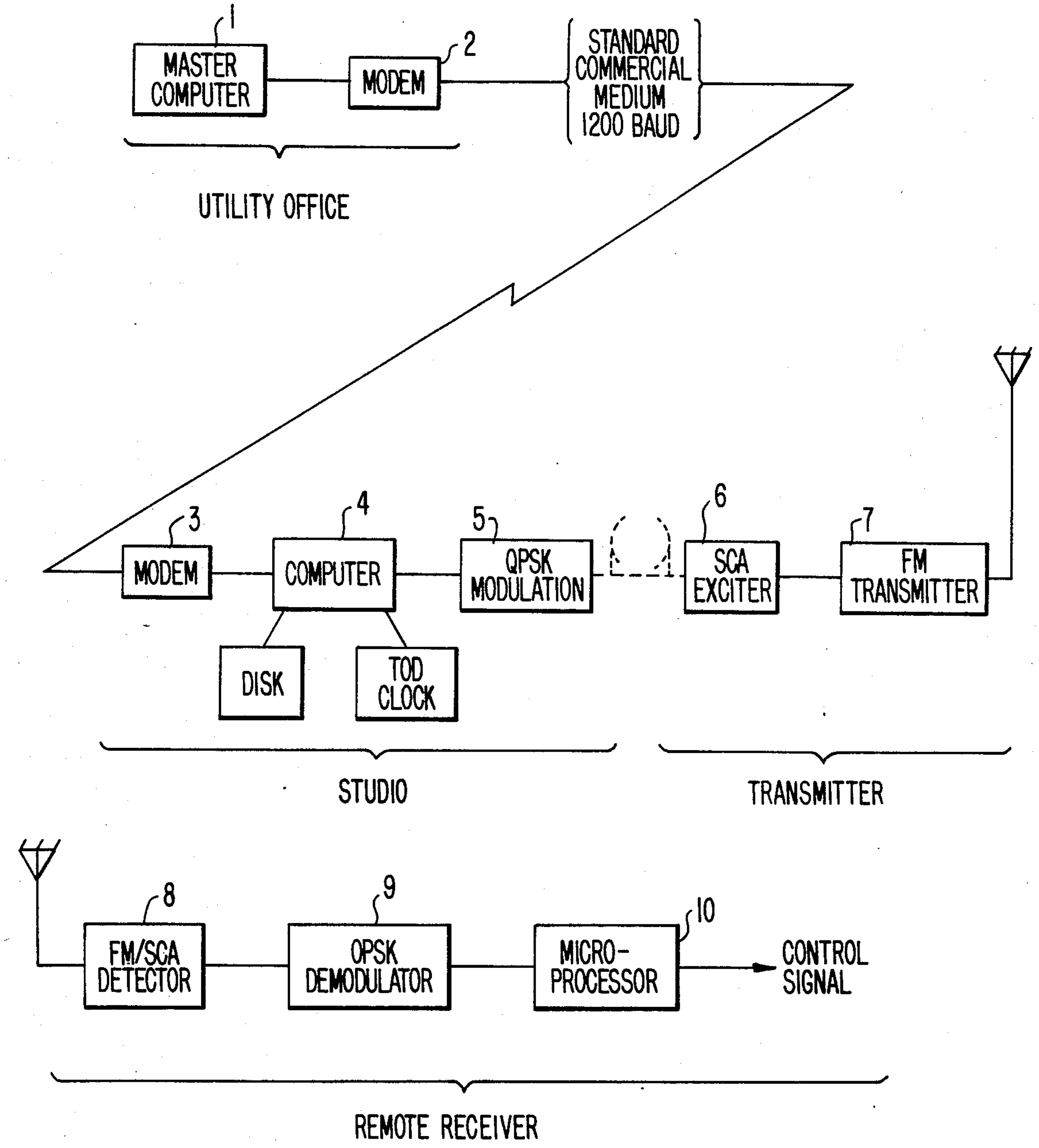
FIG. 4 is a schematic block diagram of a generalized system for QPSK modulation of an SCA channel in accordance with the present invention.
Figure 6:
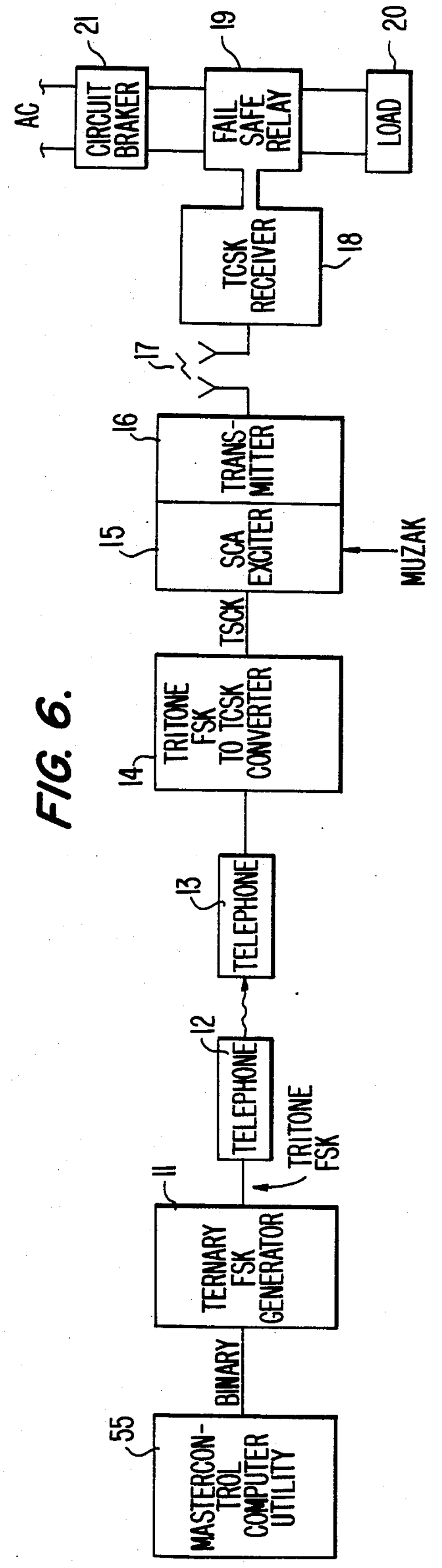
FIG. 6 is a schematic block diagram of a generalized system for TCSK modulation of an SCA channel in accordance with the present invention.

A block diagram of the total system is shown in FIG. 4 as particularly adapted for QPSK operation and a diagram of the overall system adapted for TCSK transmission is shown in FIG. 6. There are three principle sub-systems: the master control station at the utility control center, the studio transmit or sub-system at the broadcast station studio or transmitter, and the remote load control unit or receiver.

The control station may employ a conventional computer such as a Digital Equipment Corporation (DEC) PDP11/23 mini computer which is programmed according to the procedures set forth in the present invention and is linked to the FM transmitter sub-system at the broadcast channel through a suitable communication line such as a leased telephone circuit or microwave channel.

The transmitter sub-system contains another computer which receives the decoded program direction messages and formats them for transmission by the FM/SCA exciter and transmitter. Preferably, the FM station computer is capable of a sufficient memory to permit down loading and acquisition of four days of typical load control group control sequences, to permit secure local operation over long holiday weekends and for other purposes such as to render the transmit station insensitive to momentary interruption between the central utility station and the studio FM transmitter. Before entering the FM transmitter, the messages are converted into QPSK audio signals for introduction in to the SCA exciter. After transmission, the FM/SCA signal is received by a QPSK data receiver at the site of the load, is demodulated and the resultant data fed to a microprocessor to derive control signals to govern the functions of the user load device system.

It is important to introduce certain of the desired characteristics of a basic message structure. The following discussion sets forth a summary of a QPSK audio tone transmission and is followed by subsequent general discussion of a more comprehensive code termed TCSK.

QPSK-BINARY FORMAT

In a binary symbol format, the embodiment uses QPSK. In the binary symbol format, one symbol is formed with two chips. Each of those chips is a transmission of one of four possible phases of the audio carrier signal on the SCA channel-zero degrees, plus 90 degrees, minus 90 degrees, or 180 degrees. There were two constraints to that transmission imposed by the PLL detection approach for the QPSK signals. For those symbols frequently transmitted, the average phase is forced to be zero degrees, while for symbols infrequently transmitted, minus 180 degrees phase can be utilized. Ignoring these constraints, the maximum number of symbols, NS, for M=2 chips and N=4 possible phases or states per chip is $NS=N^M=16$ possible symbols. The constraint that the sum of those phases must average to zero over the two chips (and excluding the 180° case) reduces that number to three possible states. Those 3 symbols were referred to as "X" which is 0°,0°, "1" which is +90°,−90° (+90° phase shift followed by −90°) and "0" which is −90°,+90°. Those 3 symbols are the only ones which could be used frequently in the message transmission. However, if you allow the use of 180° to be infrequently used for some symbols, then you have a maximum possible of 6 symbols which included the "T", "P" and "S" symbols of 180°, 0°; 0°, 180°; and 180°, 180°, respectively. Those are the basic six symbols used in the binary symbol format used for the QPSK transmission.

The modulation approach uses Quadraphase-modulated (QPSK) audio tone on the SCA channel (67 kHz±4 kHz deviation FM modulated subcarrier) of a commercial FM broadcast station. The use of an audio tone carrier frequency of 3495.6494 kHz has been demonstrated, but other frequencies within the 5 kHz SCA bandwidth would be acceptable.

QPSK allows the transmission of one of four possible phase conditions (0°, 90°, 180°, or 270°) in each "bit time," hence, the data content per "bit time" is $\log_2(4)=2$ bits, assuming equal probabilities. This allows defining up to 4 symbols for a single bit time. Bit times may also be taken in combinations for redundancy and/or for defining a larger symbol base. The PLL decoding constraints discussed above limit the number of symbols to 6 for two "bit" (quaternary chip) times.

A baseline set of defined symbols from which the load management message is constructed includes:

"X"=DON'T CARE "0"=Binary 0; "1"=Binary 1; and "T"=DELIMITER or TERMINATOR; "X" is transmitted continuously when no load management message is being sent and within the address portion of the load management messages to indicate those portions of the address to be ignored (i.e., address bits to be masked out).

"0" is the usual binary "zero" representation in commands or unmasked portions of addresses.

"1" is the usual binary "one" representation in commands or unmasked portions of addresses.

"T" is used to define the start of messages (preamble), to truncate or terminate an address transmission when the relevant information has been passed (eliminating unnecessary "X's", to delimit between various sections of messages in the variable message format, and finally, to terminate the messages.

Message Format

Inter-Message Transmission: Continuous "X" characters (this is 0° phase in QPSK).

Preamble: "T" character or combination of "T" with other characters used to define start of message and establish bit time synchronization if not already established.

Address (Variable Length): Combination of "0", "1" and "X" characters up to 64 characters or bit times in length (typically 8 characters), beginning immediately following the preamble and terminated with a "T" (special) character terminator. Parity or CRC bits for the address may be transmitted after this terminator. Address is typically divided into various sections which may include:

- Temperature Zone (3 or 4 bits)
- Unique address of control point (e.g., 21 bits for 2 million units unless power substation code is made part of unique address, which would bring it down to 15 bits)
- Station (10 bits identifying power substation serving user)
- Customer Type Identification (3 or 4 bits identifying customer as residential, commercial, industrial, etc.)
- Reply Data Receiver Areas (up to 8 bits identifying which receiver site can best pick up reply data)
- Optional Geographical Coordinate Addressing (8 or more bits, 8 bits defining a 16×16 grid pattern, 12 bits defining a 64×64 grid, etc., X's in least significant N-S and E-W coordinate values would effectively coarsen the grid as desired; might be used if certain areas were known to have clouds or fog while other areas were sunny and hot to modulate the temperature zone approach to load control)

Address Terminator (1 bit time which can be placed at any point in the address has the effect of X's in the remaining address space from point of transmission to maximum address length, without the need to take the time to send them)

Address Parity/CRC bits (1 bit minimum, typically 4 bits for error detection, and possibly error correction if redundant coding is employed transmitting check bits for the address separately here allows validation or correction of the address then retaining only the information as to whether it was a valid address for this unit and, if so, whether it was a unique addressing of this unit, thus freeing the valuable RAM space in the microprocessor for command handling)

Address Parity/CRC Terminator (1 bit time with possible extra bit to allow processing time for address validation and also demarks start of command)

Command (8 bits to allow a rich and versatile command repetoire including both "direct action" commands, both immediate and with random [from unit to unit] delay—and "internal state control" commands such as setting flags to "lock-out" later general load control commands)

Command Data Word (4 bits minimum, preferably 8 bits for future expansion, such as for establishing temperature set points; data for load control duty cycle would require only 2 to 4 bits, but the added potential in expansion capabilities makes the 8 bit data word a better choice)

Command Parity/CRC (1 bit minimum, 2 to 4 bits typical for error detection, or possible error correction in redundant coding approaches, for the command and data words)

Command Terminator (1 bit minimum, possibly 2 bits to allow adequate time for command decoding to determine if post—command bits are to be received and what to do with them e.g., security bit check, write to display, etc.)

Post-Command Data [If Required for Specific Command Message] (Variable length, up to 256 bits, as determined by the nature of the command for security check bit requirements, for example, as by length specification by the data word for "data transfer" instructions, as to a display device)

Message Terminator (2 bit times minimum, denoting end of complete message).

TABLE I

| FREE-FORM LIST OF POSSIBLE COMMAND TYPES | |
|---|---|
| SCRAM: | Dump all controlled loads immediately. |
| Delay off: | Turn your specific controlled load off after the delay time (unique to control point) specified in the ROM. |
| Delay on: | Turn on specific controlled load after the unique delay. |
| Duty set: | Set the duty cycle for controlled load to the value specified by the date. Since "ON" or "OFF" could be specified in the data, the "Delay off," "Delay on," and "Duty set" commands could be the same. |
| Rep-Rate Set: | Set the repetition cycle time for controlled load if other than default value is specified in ROM. |
| Reset: | Reset microprocessor, set all operating variables to nominal (ROM-specified) values, set clock time (if applicable), decontrol all loads, etc. This command is normally used only after power failures, communication channel glitches, etc. Although this capability might not be absolutely necessary, it would represent a valuable method of coping with system glitches (software or hardware). This is a special control function, not an addressed command. |
| Pre-Exception: | For the next twelve (12) hours, this unit will be excepted from some specific load control command, with the command data instead limited by the value data. This command should be followed by the security bits for that unit. This command overrides a general command before the general command is even received. |
| Post-Exception: | This unique command undoes the effect of a general command and probably should also require security bits. Basically this command overrides a general command after that command is received. |
| Reply: | There could be more than one of these commands to specify different reply message or modes. Data here could refer to variable data rates in the reply for hard to receive locations. In general this command requires a security code. |
| Reply by Exception: | This command is addressed by receiving area with a delay according to the unique ROM delay. |

TCSK-EXTENDED HEXADECIMAL SYMBOL FORMAT

The extended hexadecimal ("hex") symbol format used in the TCSK system of this invention involves ternary transmission instead of the quaternary (4 possible phases) transmission discussed in relation to the QPSK binary symbol format. TCSK involves 3 possible states per chip time, referred to as an "N" (or neutral), a "+" and "−" that correspond to frequency deviations of an SCA carrier frequency ("N"=no deviation of SCA carrier from nominal 67 kHz frequency, "+"=a positive deviation by a specified amount from 67 kHz and "−"=a negative frequency deviation from 67 kHz by this same amount). The constraint in this case is that the average frequency deviation over the number of chips per symbol must be 0. Actually, the average frequency of the SCA signal must remain at 67 kHz and as a consequence, the above constraint is applied.

The particular embodiment of all of the possible sets of symbols those constraints for ternary transmission has been found optimum when 4 chips are transmitted per symbol. Again, using $NS=N^M$, if you take the number of states, N=3, and the number of chips, M=4, the maximum possible number of symbols would be $NS=3^4$ or 81 possible symbols. When you apply the further constraint that the average over those 4 chips must be 0, that leaves you with 19 possible symbols as set forth in Table II. That is a very fortunate combination because that provides all 16 hex digits, 0 through 9, and A–F (equivalent to the decimal numbers through 0–15), plus 3 additional symbols. Those 3 additional symbols are defined as S=space, which is all N's, X, which corresponds to the don't care symbol, and T which corresponds to the address terminator symbol. These 3 additional characters plus the 16 hex digits can all be formed in a symbol of 4 chips long. That exceeds the number of possible symbols which could have been transmitted in unconstrained binary format since 4 binary chips would only allow $NS=2^4=16$ possible symbols corresponding to the actual hex numbers, hex 0 through hex F.

The nineteen symbols is a very useful combination for another reason: you can encode, process and store these "hex" symbols nicely in an 8 bit computer. Had a longer number, N=6 or larger been selected, one could not as easily fit such symbols in one data word in an ordinary 8 bit machine. In other words, the hex format as provided herein lends itself to microcomputer implementation because when you have a ternary transmission as opposed to binary transmission, one chip cannot be represented by a single binary bit because one chip in this case has 3 possible states, an "N", "+", or "−", so that a single binary bit cannot represent a single ternary chip. Hence, you need, in the simplest encoding approach for these symbols in a microprocessor, to assign 2 binary bits to cover what is later transmitted or has been received as one ternary chip. That means that if you have 4 ternary chips forming a symbol, it requires 8 binary bits in the computer for that symbol. This is very convenient because a very wide selection of microprocessors with 8 bit words is available and it also makes the associated microprocessor programming implementation is very straight forward.

Hence, in TCSK there are 19 standard symbols, including the 16 hexadecimal numbers (0—F), three special symbols including space, universal ("DON'T CARE") and terminating characters which provide for intermessage spacing, variable length messages and logical group addressing as set forth above. In TCSK, the frequencies of the SCA carrier actually define the 3 ternary chip states, where "N" corresponds to the nominal SCA carrier frequency, $f_o=67$ kHz, and "+" corresponds to $f_o+F$ and "−" to $f_o$-F, where F is the selected TCSK deviation frequency. As used herein, the word chip is used as a generalization of what in a typical digital discussion would be called a binary bit. In this case it represents in communication the transmission of one possible state which for QPSK was either 0°, +90°, 180° or −90° of an audio tone on the SCA channel. For TCSK it's an 0 deviation, + deviation, or − deviation of the SCA carrier frequency. A chip represents a single state information unit that can be transmitted through the communication channel. In a binary system that is always called a bit, which term is also used as a measure of information content. Because of this, in a ternary or quadraphase symbol transmission you have to give a different name to this elemental state information unit—we use the term "chip". So the term chip is a generalization of the term bit for cases when more than 2 possible states can be represented by one of these minimum transmission intervals.

The word "chip" herein is distinguished from its use in other contexts. At least one other context where that term chip has been used is what is called spread spectrum communication where a binary bit is formed of rather long combinations of 0's and 1's and only certain combinations are meaningful. By transmitting in this form they increase the apparent data rate and produce a transmitted signal that looks like noise. In that case a binary 0 or 1 might be represented by 20 or 50 or 100's of chips which are themselves 0's and 1's but are transmitted in combinations which make that signal appear over a wide band in the frequency spectrum rather than being confined to a narrow band. The term chip has been used in that different context, but it not so used herein.

TCSK CARRIER CODING

In the Ternary Carrier Shift Keying (TCSK) approach for SCA data transmission we have developed, three transmission states are defined in any "bit time" (ternary chip time): "N" (neutral) as represented by an $f_N=67.0$ kHz SCA carrier frequency, "+" (positive deviation) as represented by $f_{30}=f_N+f=70.5$ kHz SCA carrier carrier frequency and "−" (negative deviation) as represented by $f_-=f_N-f=63.5$ kHz SCA carrier frequency (for F=3.5 kHz). An important constraint is that the *average* carrier frequency for the SCA signal is to be 67.0 kHz ($f_N$), which means that +'s, −'s and N's cannot be simply transmitted in random patterns depending on the data. We can insure this condition by combining ternary chips into groups or codes, and only using the codes which have an average frequency of 67.0 kHz (i.e., equal number of +'s and −'s). These codes are then treated as the basic communication symbols and may be transmitted in any arbitrary pattern without worrying about very low frequency components in the signal or any shift in the average SCA carrier frequency from its specified 67 kHz value.

The selection of the number of ternary chips, n, to be used in the TCSK codes is a balance between the loss of efficiency if the codes are too short (e.g., there are only 3 allowable codes for n=2) and the complexity of decoding very long, although efficient, codes (e.g., n=6 has 125 allowable codes out of a total of 729 possibilities). For our purposes, a code length of n=4 appears ideal in terms of capacity and ease of decoding in an 8-bit microprocessor. There are 19 allowable n=4 chip ternary codes which allows us to represent all 16 of the 4 bit binary numbers (0 through 15, or, in hexadecimal notation, $0 thru $F) plus three "special codes". For load management messages, we will use these "extra" three symbols as "S" (a 4 chip blank or space or "no message"), "T" (a 4 chip address terminator, preamble or delimiter character), and "X" (a 4 chip "don't care" character for logical group addressing).

In a binary system, such a microprocessor, a ternary chip must be represented by two binary bits; $d_1$, $d_o$. (also referred to herein as $D_1$, $D_0$). For example, in our system, we have chosen to represent an "N" in terms of $d_1$, $d_o$ as "N"−0,0 (decimal equivalent−0), a "+"=0,1 (decimal equivalent=1) and a "−"=1,0 (decimal equivalent=2). There is, of course, no $d_1=1$, $d_o=1$ chip state in a ternary system (that would require a quarternary system), but if elementary $d_1$, $d_o$ data from a TCSK decoder is to be stored, it will require 2 bits per ternary chip to represent it. This makes our n=4 chip code case very handy, since this requires 4×2=8 bits to represent a code, and this is exactly the data word length of the microprocessors of interest. We can also use 8 bit lookup table techniques (256 words of ROM) to very quickly and easily decode the raw 4 chip (8 bit) TCSK data into the 19 symbols ("S", "T", and $0 thrugh $F) from which the TCSK load management messages are created.

The 19 allowed 4 ternary chip codes, and their 8 bit binary representations in the $d_1$, $d_o$ format (shown in parenthesis as a two hexadecimal digit number) are shown in Table II.

Note that all of these allowed codes have equal numbers of +'s and −'s as required to insure that the average SCA carrier frequency is maintained at 67.0 kHz.

TABLE II

| TCSK n = 4 CHIP SYMBOL DEFINITIONS | | | | | |
|---|---|---|---|---|---|
| SYMBOL | | TERNARY CHIP PATTERN | BINARY REPRESENTATION | HEX | MEANING |
| "S" | = | NNNN | 00000000 | (00) | "SPACE" |
| $0 | = | NN+− | 00000110 | (06) | |
| $1 | = | NN−+ | 00001001 | (09) | |
| $2 | = | N+N− | 00010010 | (12) | |
| $3 | = | N+−N | 00011000 | (18) | |
| $4 | = | N−N+ | 00100001 | (21) | |
| $5 | = | N−+N | 00100100 | (24) | HEXA-DECIMAL |
| $6 | = | +NN− | 01000010 | (42) | |
| $7 | = | +N−N | 01001000 | (48) | |
| $8 | = | ++−− | 01011010 | (5A) | NUMBERS |
| $9 | = | +−NN | 01100000 | (60) | |
| $A | = | +−+− | 01100110 | (66) | |
| $B | = | +−−+ | 01101001 | (69) | |
| $C | = | −NN+ | 10000001 | (81) | |
| $D | = | −N+N | 10000100 | (84) | |
| $E | = | −+NN | 10010000 | (90) | |
| $F | = | −++− | 10010110 | (96) | |
| "T" | = | −+−+ | 10011001 | (99) | TERMINATOR |
| "X" | = | −−++ | 10100101 | (A5) | "DON'T CARE" |

TCSK TRANSMITTER

The TCSK transmitter translates digital signals from $d_1$ and $d_o$ input lines into three accurately controlled voltage levels, as shown in Table III.

TABLE III

| OPERATING DEFINITION FOR TCSK TRANSMITTER | | | | |
|---|---|---|---|---|
| TERNARY CHIP STATE | DIGITAL INPUTS $d_1$ | DIGITAL INPUTS $d_o$ | VOLTAGE OUTPUT | SCA CARRIER FREQUENCY |
| "N" | 0 | 0 | $V_{REF}$ | 67.0 kHz |
| "+" | 0 | 0 | $V_{REF} + \Delta V$ | 67.0 + Δf |
| "−" | 1 | 0 | $V_{REF} - \Delta V$ | 67.0 − Δf |
| (NOT ALLOWED) | 1 | 1 | $V_{REF}$ | 67.0 kHz |

Note that the $d_1=1$, $d_o=1$ state is not defined in a ternary system, so we simply make this input equivalent in output to an "N" to allow for possible input errors.

Message Format

In the following discussion the format will be given for both TCSK and QPSK symbols although the detailed explanation in this application will be given only for the TSCK system, the general character of each system being substantially similar.

All messages begin with a preamble, the sole purpose of which is to provide a synchronization signal for the load control receiver microprocessor to acquire bit synchronization with the transmit signal.

Following the preamble, an address field is specified. The message address consists of 1–9 TCSK symbols and defines those load control receivers for which the message is intended.

The next message symbol following the address is a single symbol which defines one of 16 commands which the receiver is to perform. Because not all commands are defined there is room for new commands in accordance with the disclosed system. Most of the defined commands are followed by a data field which defines how the command is to be executed.

Following the command and data fields, a checksum message is received which may be an 8 bit checksum. If the checksum transmitted does not equal the checksum calculated by the receiver, the receiver is instructed to ignore the message.

Figure 1:
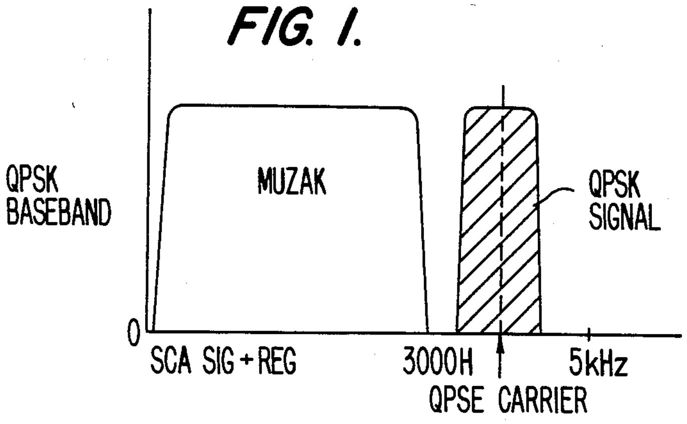
FIG. 1 is a baseband frequency spectrum of a typical SCA channel showing the addition of a QPSK signal in accordance with the present invention.
Figure 2:
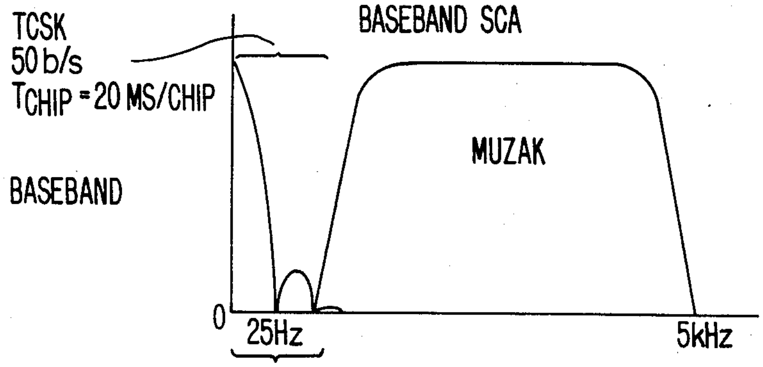
FIG. 2 is a baseband frequency spectrum of a typical SCA channel showing the addition of a TCSK signal in accordance with the present invention.

Referring now to FIGS. 1 and 2, the QPSK and TCSK baseband signals are shown as they would be on the SCA channel. As shown in FIG. 1, the QPSK signal is centered at 4,000 Hz and requires modification MUZAK signal to limit it to 3,000 Hz. In contrast, the TCSK signal of FIG. 2 is confined within the first 25 Hz of the baseband leaving the remainder for MUZAK and therefore has no significant effect whatever on the co-channel user.

Figure 3:
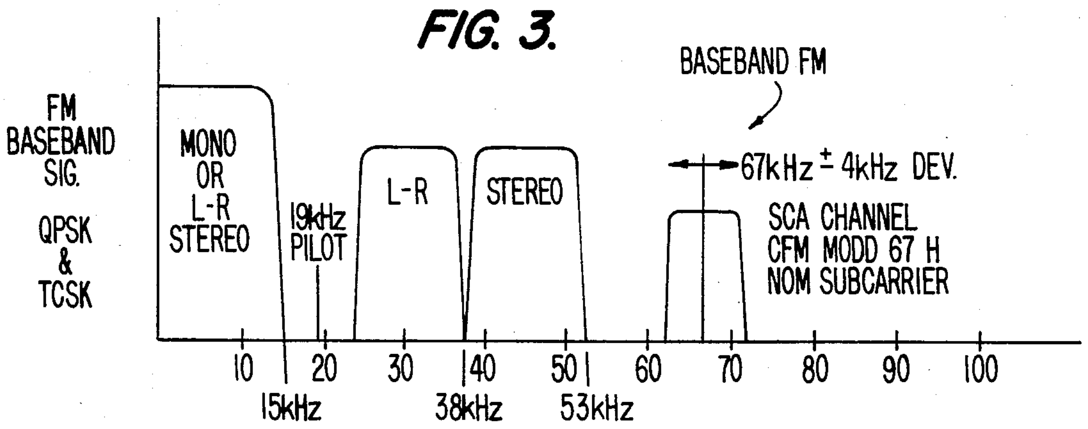
FIG. 3 is a baseband FM spectrum of a complete FM broadcast channel including SCA.
Figure 3A:
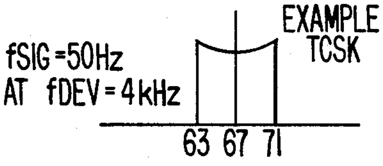
FIG. 3A is a frequency spectrum showing the addition of TCSK to SCA.
Figure 3B:
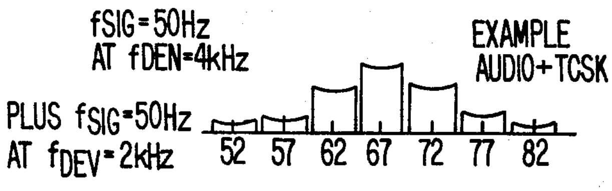
FIG. 3B is a frequency spectrum showing the addition of MUZAK to the SCA channel.

The wave shape of the TCSK portion of the baseband of FIG. 2 is as delivered by the ternary FSK to generator to a TCSK converter and retransmitter. FIGS. 3A and 3B illustrate the effect on the SCA channel of the addition of the TCSK signal and MUZAK signal respectively. As shown, the TCSK signal produces virtually no side bands whereas the background music signal will produce side bands, the output of which, at 53 Hz is controlled by FCC regulation.

Referring to FIG. 4, there is shown a general block diagram of a QPSK communication system for load control in accordance with the present invention. The three general groupings of this system include that portion at the utility office including a master computer 1 for generating a binary code of the entire message to be transmitted. This coded message is converted by a modem 2 into telephone transmittable message which may be at standard commercial rates, as for example, 12,000 baud and is received at the second major section, namely at the radio transmitting facilities including a studio and a transmitter. There another modem 3 converts telephone transmittable message back into binary code from its transmitted version where it is then delivered to a QPSK computer 4 and a QPSK modulation 5 (described below). The QPSK signal is a phase shifted signal in which each chip has the possibility of having a phase of +90°, 0, or −90°. Also permitted, in a limited way, is the use of a 180° phase. The chip format from the QPSK modulator is defined below. The QPSK signal from computer 4 and modulator 5 is then supplied to an SCA exciter 6 which for example via a microwave link and then transmitted over the air by FM transmitter section.

The last section of the QPSK system in FIG. 4 is the remote receiver which is located at the user's load and includes an FM/SCA detector 8 which may be conventional and which has an output supplied to a QPSK demodulator 9. The QPSK demodulator consists of a high frequency phase-lock loop which is used to detect the phase difference between a center carrier and the generated message. The four phases detected by demodulator 9 are then converted into four separate binary outputs which are fed to the microprocessor 10, which interprets the binary outputs and controls the load based on those outputs.

The QPSK modulator 5 consists of a four phase clock generator whose four separate, differently phased outputs are gated by transmitting computer 4 to generate the composite QPSK output. The chip definition and format have been set forth previously together with an explanation of the relationship between the message chip content and the QPSK type of signal.

Figure 5A:
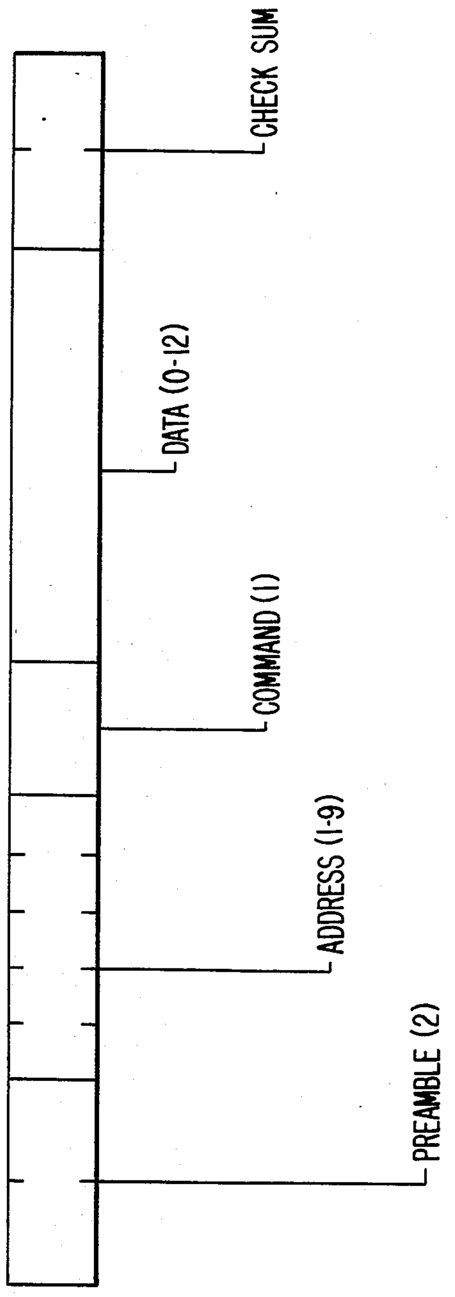
FIGS. 5A and 5B illustrate a message structure and format showing the preamble address command data and check sum features of the present invention.
Figure 5B:
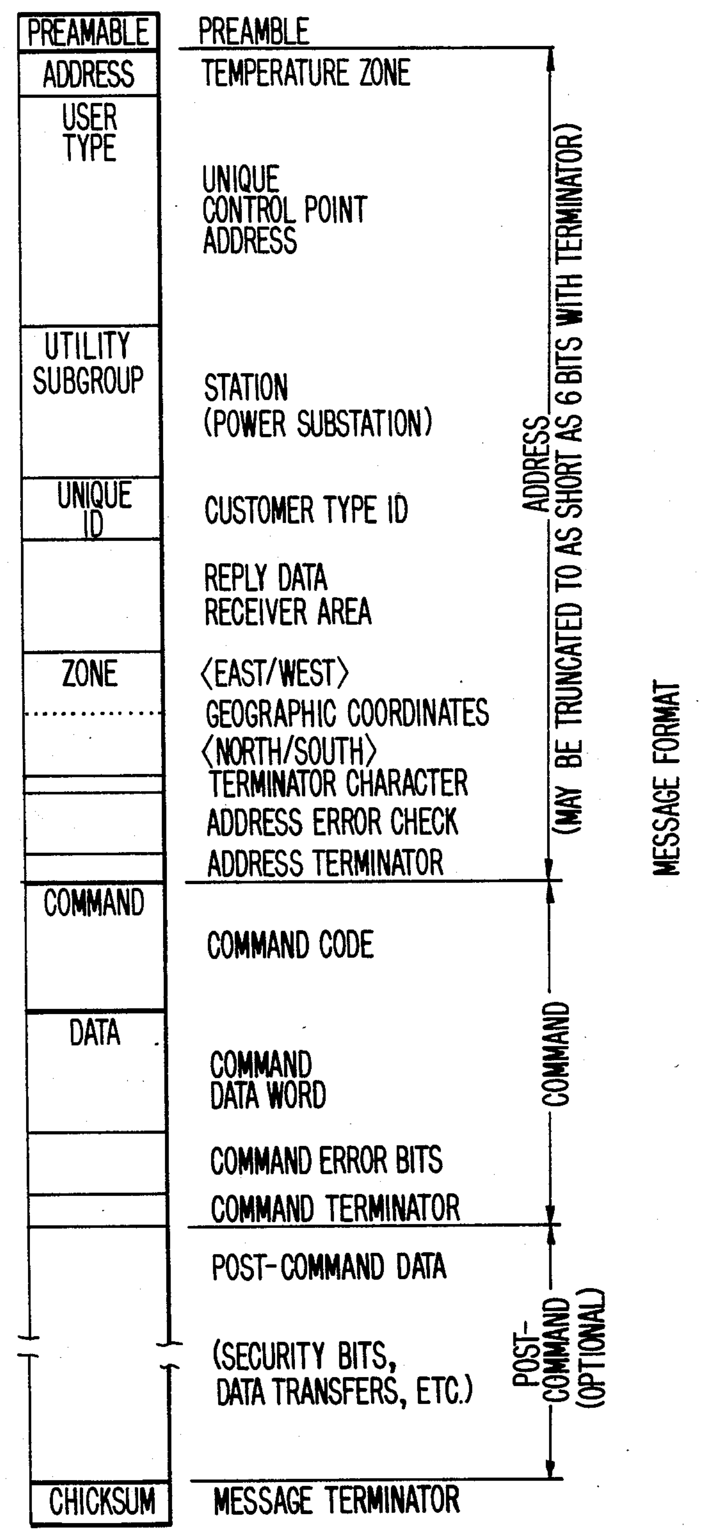

FIGS. 5A and 5B show a message format. The the left margin indicates in a vertically descending manner the binary chip content of the message and consists of essentially four parts, the preamble, the address, the command, the data, and the checksum. The type of information contained in each of these five sections is generally indicated along side of the vertical message. The general nature of the message format has been described previously.

TSCK System

The foregoing description has emphasized the use of the binary symbol format as specifically related to QPSK and to the logical group addressing format. In addition to that presented, the logical addressing group permits a variable length feature which will be described in greater detail in connection with the TCSK approach. The same approach can be effected in QPSK but will be omitted for brevity. The general simple format being considered requires the use of "N" chips per bit symbol and, particularly in the case of QPSK, 4 chips per symbol were used to develop a single binary element. Other restrictions limit the actual number of symbols to 16. In the hex symbol format using ternary code, the actual number of symbols can be shown to be 19 including the hex numbers themselves.

Referring generally to FIG. 6, there is shown a generalized communication system, in three stages, utilizing TCSK techniques in accordance with the present invention. The first stage is located at the utility and consists of a master control computer 55 having a binary output which is fed into a ternary frequency shift key (FSK) generator 11, whose output is a tri-tone FSK signal which can be transmitted via telephones 12 and 13 over telephone lines to the next stage. The first stage is shown in greater detail in FIGS. 7 and 8. The second stage, which is shown in greater detail in FIG. 9, is located at an FM broadcast transmitting facility. By transmitting facility, it is meant either a combined studio and transmitter or, if divided, a studio and transmitter which are interconnected by some communications link not shown and not necessary to the understanding of this invention. A tri-tone FSK to TCSK converter 14 at the studio receives the utility computer information in tri-tone and converts it to TCSK in a manner described below. The TCSK signal is that portion so marked in the lower frequency domain of FIG. 2. This TCSK signal is applied to the exciter 15, and then transmitted by the standard FM broadcast signal transmitter 16 over RF link 17 as a sub-audio transmission added to the SCA channel. The third stage includes a TCSK receiver 18 located at the user's load facility which is capable of decoding the SCA channel and separately decoding the TCSK signal to produce a ternary signal as previously described. This signal is converted to binary and operates a microprocessor in receiver 18 which is pre-programmed to carry out the various functions of this invention when so enabled. Generally speaking, the output of the receiver 18 can terminate in any type of load control device, a fail safe relay system 19 being shown which is located between the circuit breakers 20 at the user's location and the load 21 itself. The fail safe delay 19 operates to disconnect the load 21 from the power lines when so commanded.

Figure 7:
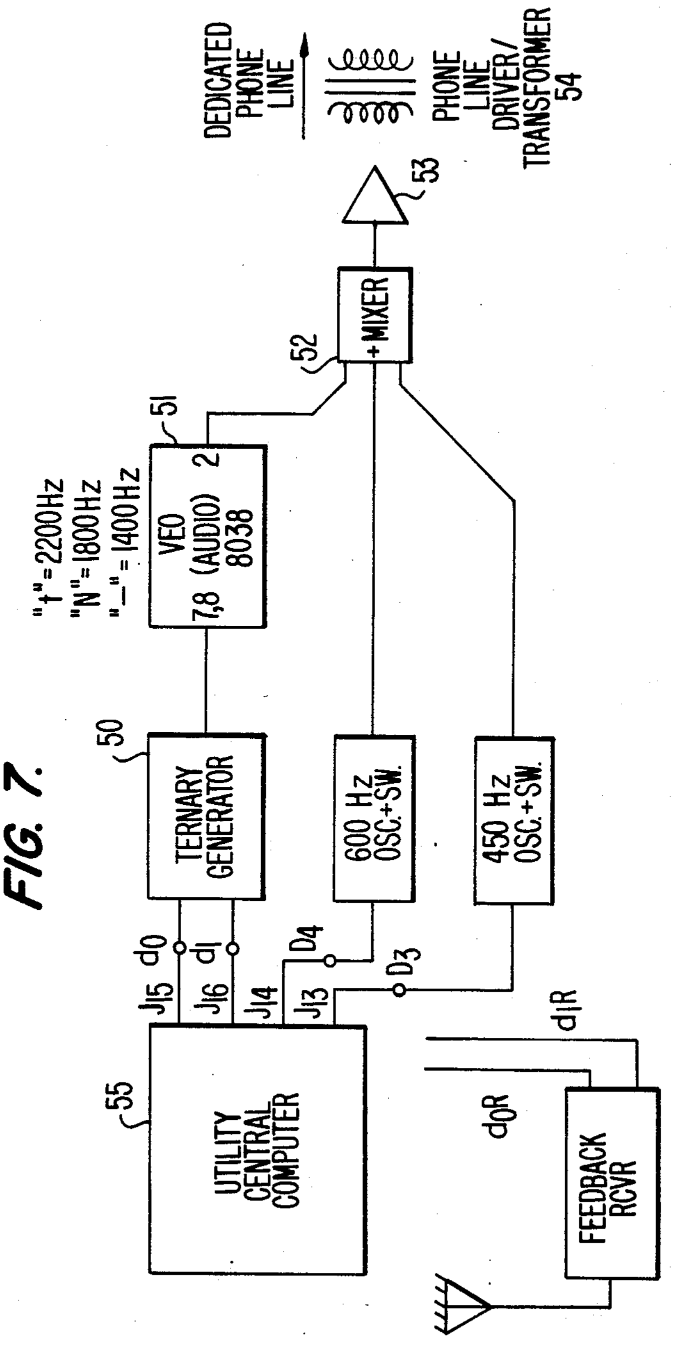
FIG. 7 is a block diagram of the utility TCSK generating facility of FIG. 6.

Referring now to FIG. 7, a general block diagram of the utility ternary FSK generator system is shown. It consists generally of a ternary generator 50 having an output converted to audio tone via VFO circuit 51 which is then supplied to a mixer 52. Additional control signals D4 and D3 are converted to tones and also apply to the mixing stage 52. The mixing stage output is taken through a suitable telephone impedance shifting amplifier 53 and transformer system 54 as shown.

Figure 8A:
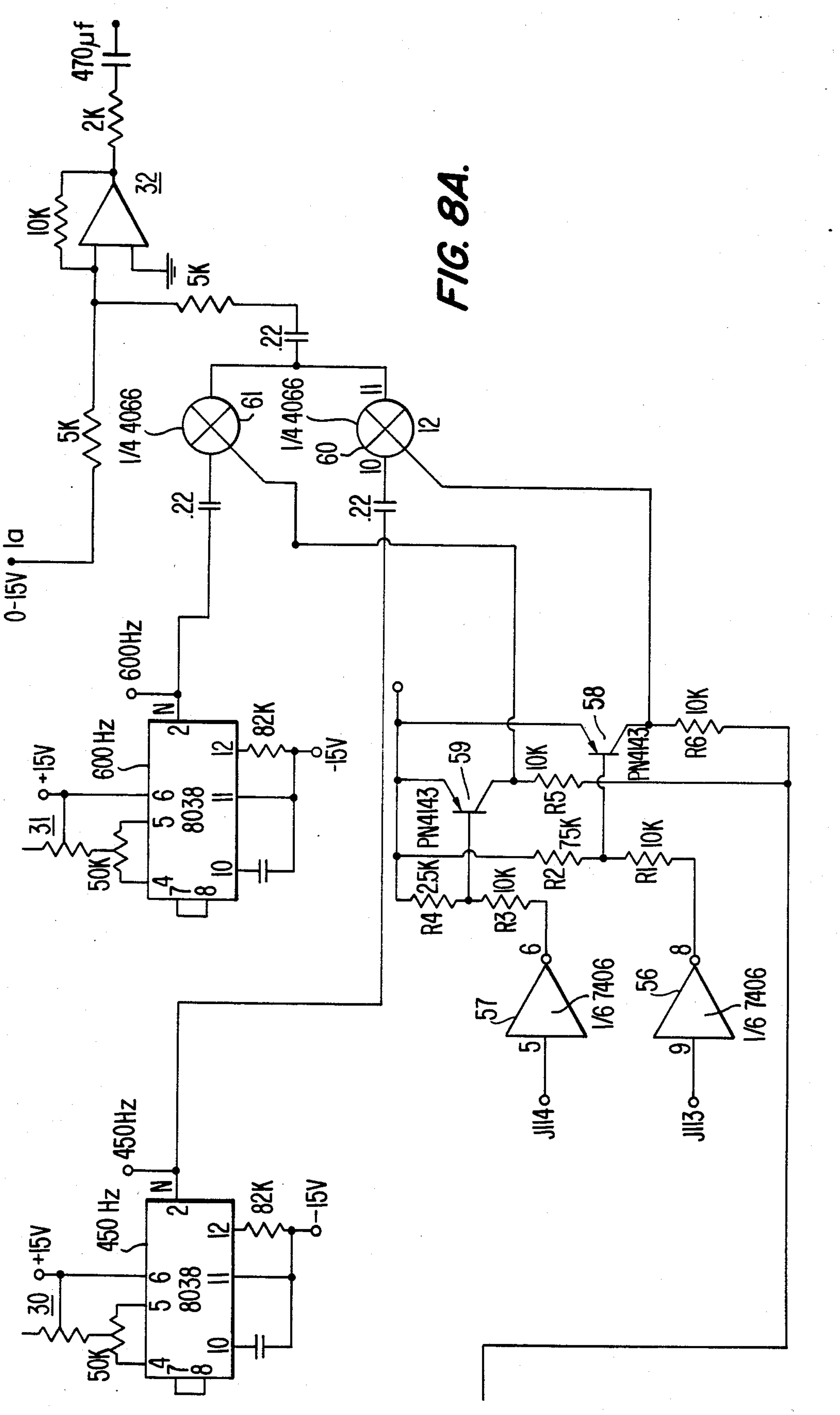
FIGS. 8A and 8B are schematic diagrams of the TCSK generator of FIG. 7.
Figure 9:
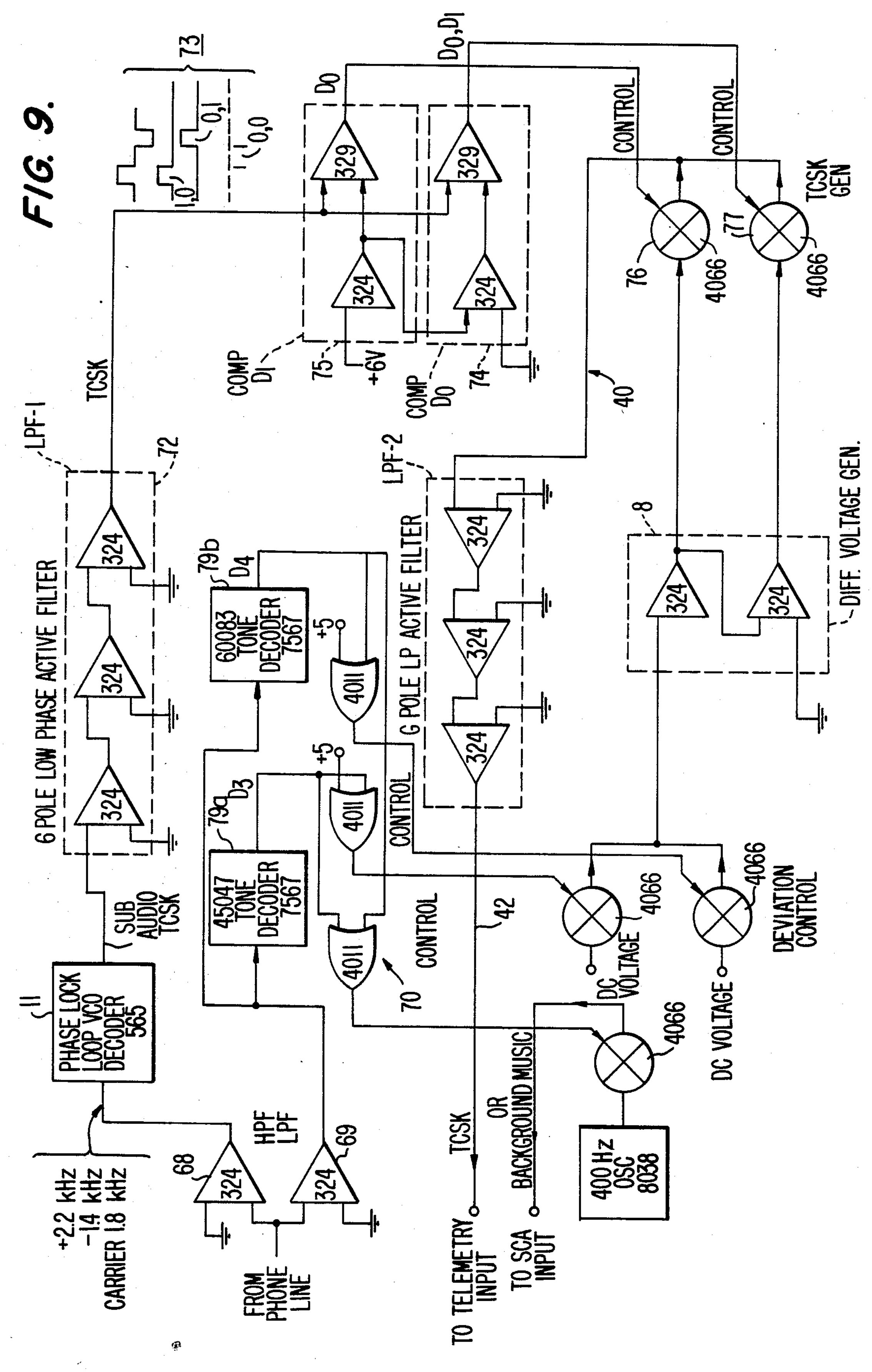
FIG. 9 is a schematic block diagram of the converter of FIG. 6.

Referring now to FIG. 8A, a summary description of the oscillator switch circuits 48 and 49 in FIG. 7 will be given. The output of the utility computer 55 consists of a binary signal D0,D1 (FIG. 7). The D0 and D1 outputs from the computer are the message data while D3 and D4 outputs are used for transmit control purposes. The transmit control signals D3, D4 are taken to pins J14, J13 of logical inverters 56 and 57, the output of which is passed, via resistors R1–R6, through a level adjusting amplifiers 58 and 59 and control switches 60 and 61, respectively, the other input of switches 60 and 61 is derived, respectively from oscillators 30 and 31, a 450 Hz oscillator and a 600 Hz oscillator. Oscillators 30 and 31 each comprise 8038 chips connected to resistors having the values shown and a capacitor selected to give the desired oscillation frequency. The oscillator outputs, after passing through the switches 60 and 61, are combined then are taken to an input of mixer 32 for application to the telephone line after being combined with the data signal to be described. The after component values are as shown in FIG. 8A.

Figure 8B:
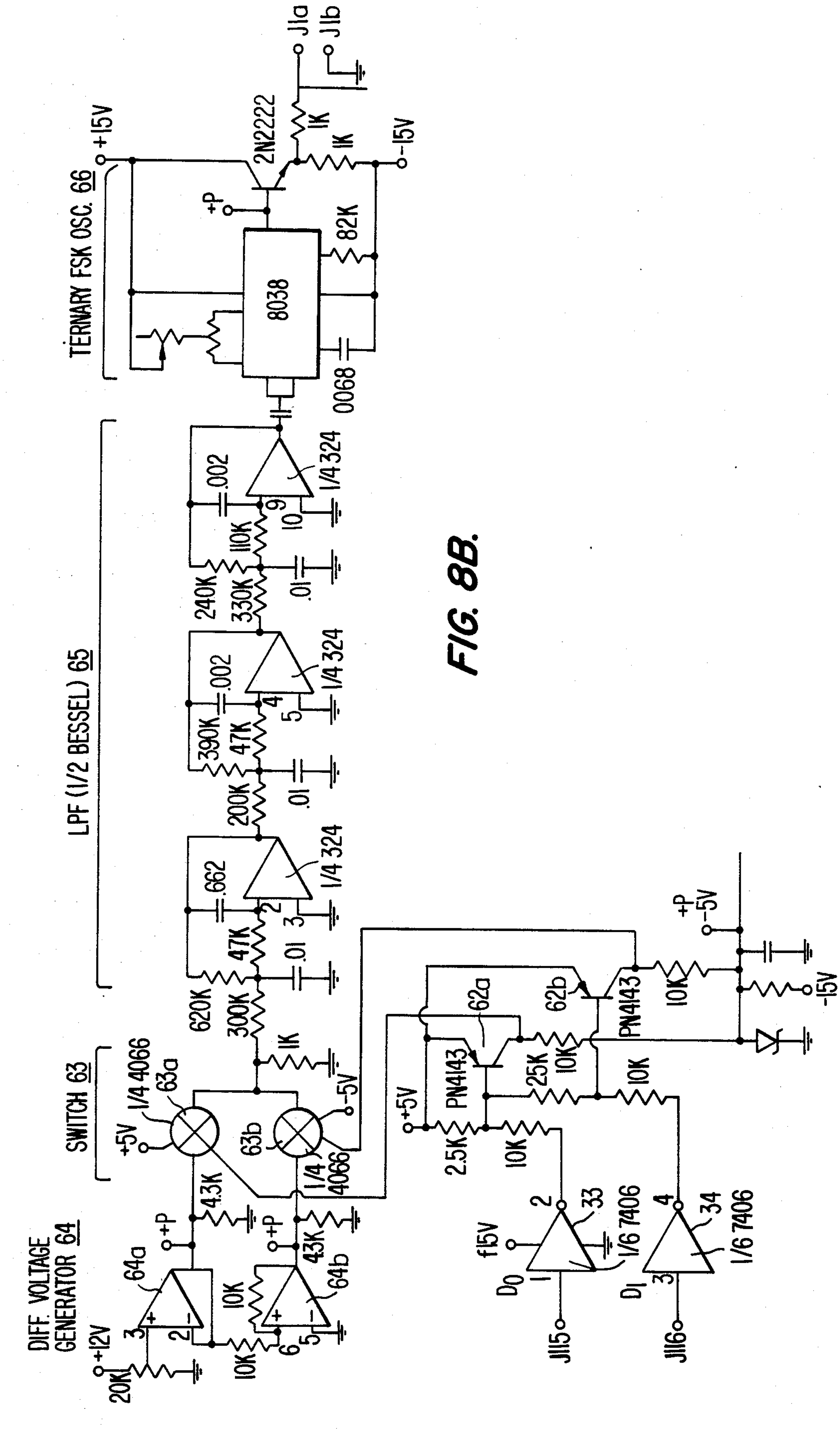

Referring now to FIG. 8B, showing the details of ternary generator 50 and VFO (audio) circuits 51, the data signal D0, D1 is applied to the inputs J15, J16 of inverters 33 and 34 which are followed by a level adjust circuit 62*a*, 62*b*, respectively. The outputs of level adjust circuits 62*a* and 62*b* are inputs to switches 63*a* and 63*b* which are part of control data signal switch 63 circuit. The other input of each of switches 63*a* and 63*b* is taken from a difference voltage generator 64, comprising voltage generators 64*a* and 64*b*. The appears at the output of switch 63. This signal is a sub-audio signal and is passed through the first half of a low pass filter 65 which is of the Bessel type for purposes which will be further described hereinafter. Basically, the filter confines the output signal to a bandwidth adequate to pass a 50 bit per second data rate but eliminates the harmonics of the signal unnecessary for that purpose and which would cause interference modulation with other cochannel users. The tri-state output of the filter is taken as the input to an 8038 oscillator 66 and serves to modulate the oscillator between a center frequency and higher and lower frequencies in synchronization and correspondence to the input signal.

The output of oscillator 66 is then taken to the mixer 52 and then supplied to the telephone lines. As will be seen, the frequencies available are the ternary FSK signal of 3 frequencies representing the data to be transmitted as well as the 450 Hz and 600 Hz control signals representing D4, D3.

FM Broadcast Stage

At the FM broadcast studio, a telephone circuit provides an input to a tri-tone FSK to TCSK converter shown in detail in FIG. 9. Thus, the input is divided by a high pass filter 68 and low pass filter 69 into different frequency bands, a low pass filter going to tone decoders 79*a* and *b* for 450 Hz and 600 Hz signals to again develop signals D3, D4 which are applied to a logic gate 70 described below.

The output of the high pass filter 68 which is set to pass frequencies above about 800 Hz is applied to a phase-lock loop decoder 71 operating at a center frequency of 1.14 kHz. The decoder again generates the sub-audio TCSK signal which is taken through a low pass filter 72 to eliminate high frequency harmonics. This filter is not as critical as the previously described Bessel filter but is useful to assure that the carrier frequency of 1.8 kHz and the associated signal frequency at 2.2 kHz and 1.4 kHz are removed, as well as the harmonic frequencies introduced into the signal by operation of the phase-lock loop decoder.

The output signal from the low pass filter 72 appears as a tri-state signal as shown in the signal graph. This tri-level output signal is then converted to a binary signal, namely D0 and D1, through the action of comparators 74 and 75. These binary signals are then subsequently used to control two switches 76, 77 whose inputs are derived from a differential voltage generator 78. The input of the differential voltage generator 78 is taken from a pair of deviation control switches 180 and 181 which serve as a scale control for the amount of FM deviation to be used in the transmission.

The signals D3, D4 are taken from the decoders 79 and 80 through the logic circuits 70 and are used to supply the control signals for operating the deviation control switches previously explained.

The output of the TCSK generator, i.e., the outputs of switches 76 and 77 is passed through an additional low pass Bessel filter 182 which may be identical to the previous filters. Bessel filter 182 controls it and limits the bandwidth to the sub-audio region any high harmonics generated in the TCSK generator. The output of filter 182 is the telemetry output or wide baseband output of the SCA exciter to which it is connected.

TCSK Receiver

Figure 13:
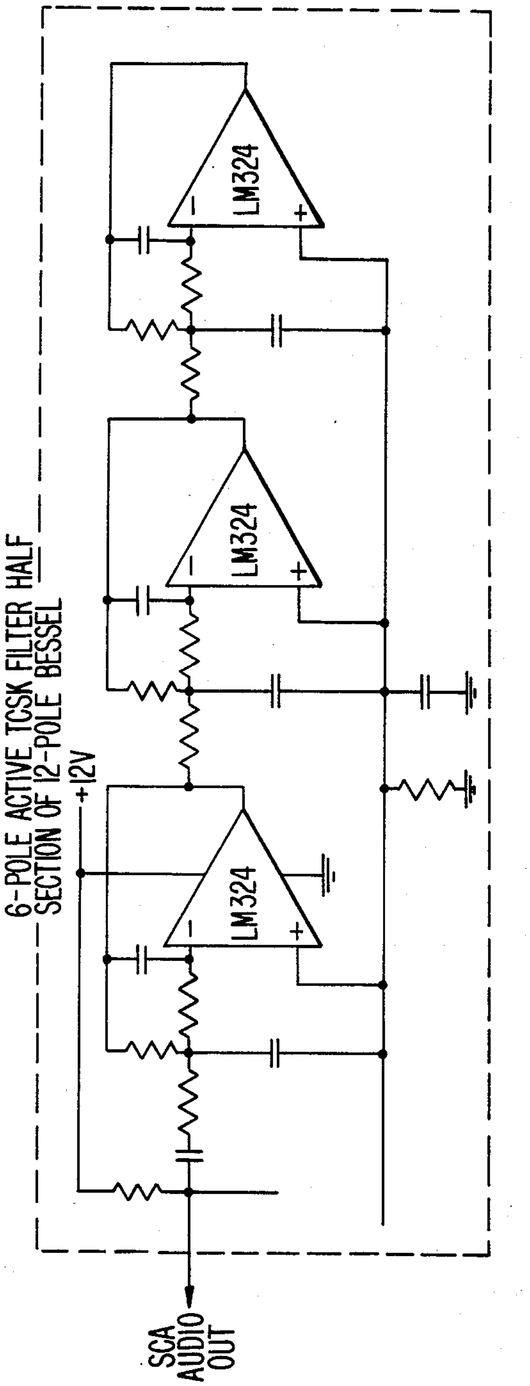
FIG. 13 is a schematic diagram of a Bessel filter section constructed in accordance with the present invention.
Figure 10:
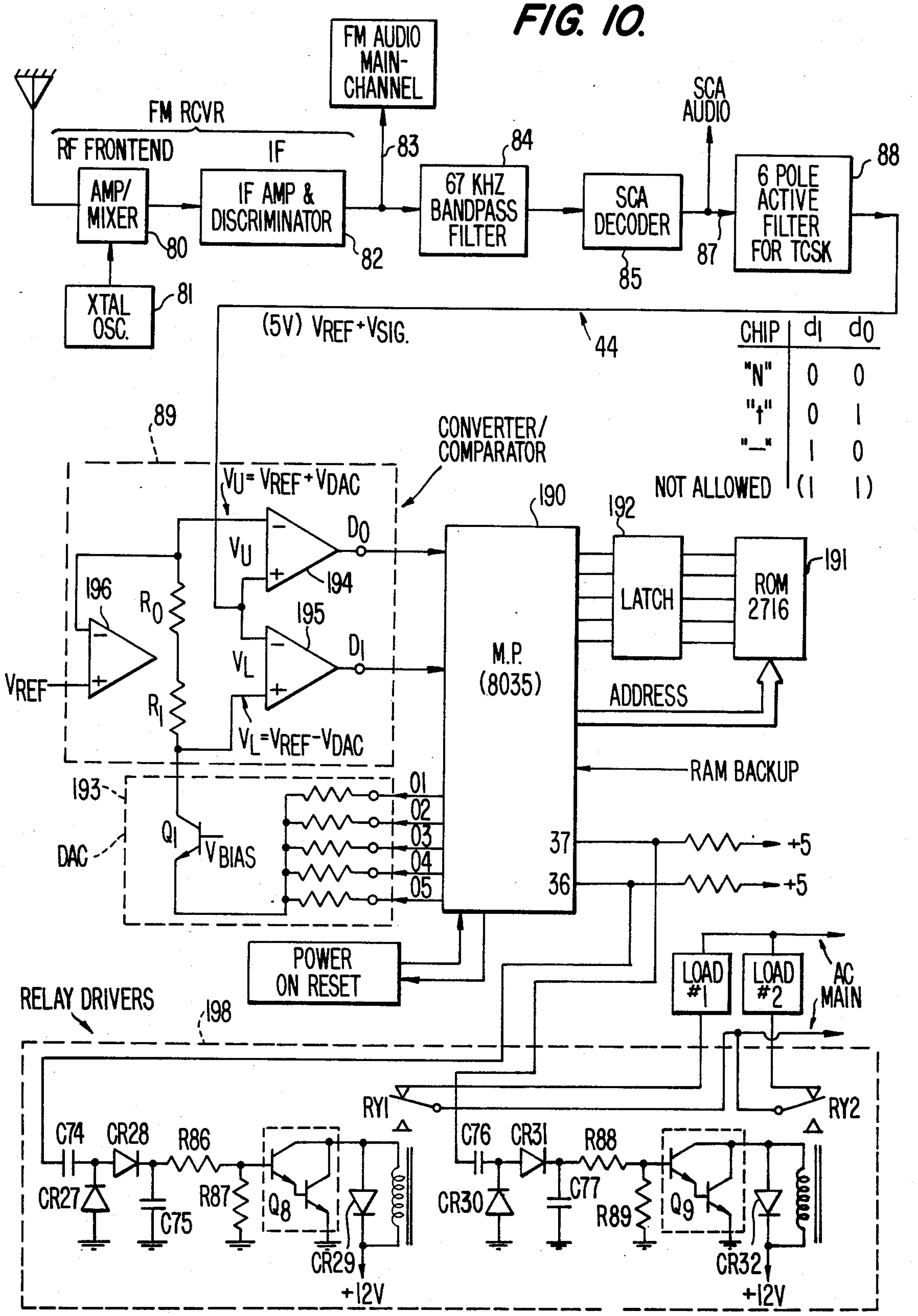
FIG. 10 is a schematic diagram partially in detail of the TCSK customer receiver of the system of FIG. 6.

Referring now to FIG. 10, a general block diagram of the TCSK receiver in FIG. 6 is shown and consists of a conventional amplifier mixer RF front end 86 including a crystal oscillator 81 for producing an IF frequency which is passed through and IF amplifier and discriminator strip 82 to derive an FM audio main channel signal which is removed at 83. The 67 kHz centered SCA channel is taken through an SCA band pass filter 84 and an SCA decoder 85 to produce an SCA audio signal at 86 and a sub-audio signal at 87 which is passed through a 6 pole active TCSK filter 88. The decoder 85 and filter 88 are set forth in detail in FIGS. 11 and 13, respectively.

The output of the filter 88 is a tri-state output TCSK signal and is converted back to binary in a converter/comparator circuit 89 to derive the binary signals D0, D1 which are applied to the appropriate inputs of a microprocessor 190 (8035). The microprocessor configuration is standard and includes an associated ROM 191 for storing the operating program as well as a latch circuit 192 for controlling operation of the memory access to the microprocessor. Addressing is conventional.

The threshold of converter/comparator circuit 89 is adaptively controlled by the computer 190 through five appropriate output lines 01–05 and D to A converter 193. This D to A converter 193 sets the threshold of the TCSK decoding comparators 194 and 195 by adjusting the output voltage from amplifier 196 whose input is coupled to a reference voltage V reference. The optimization circuit which is achieved by the digital to analog conversion (DAC) and the comparator control serves the following purpose. The purpose of this circuit is to optimize the signal to noise ratio to minimize the bit error rate of the received signal. The PAC accomplishes the foregoing by adaptively controlling the threshold level of the comparator 89 by adjusting a voltage bias at the transistor Q1 which in turn adjusts the through current resistors R0 and R1 in comparator circuit 89. In this way, the threshold voltages generated by the converter 89 are obtained.

Figure 11:
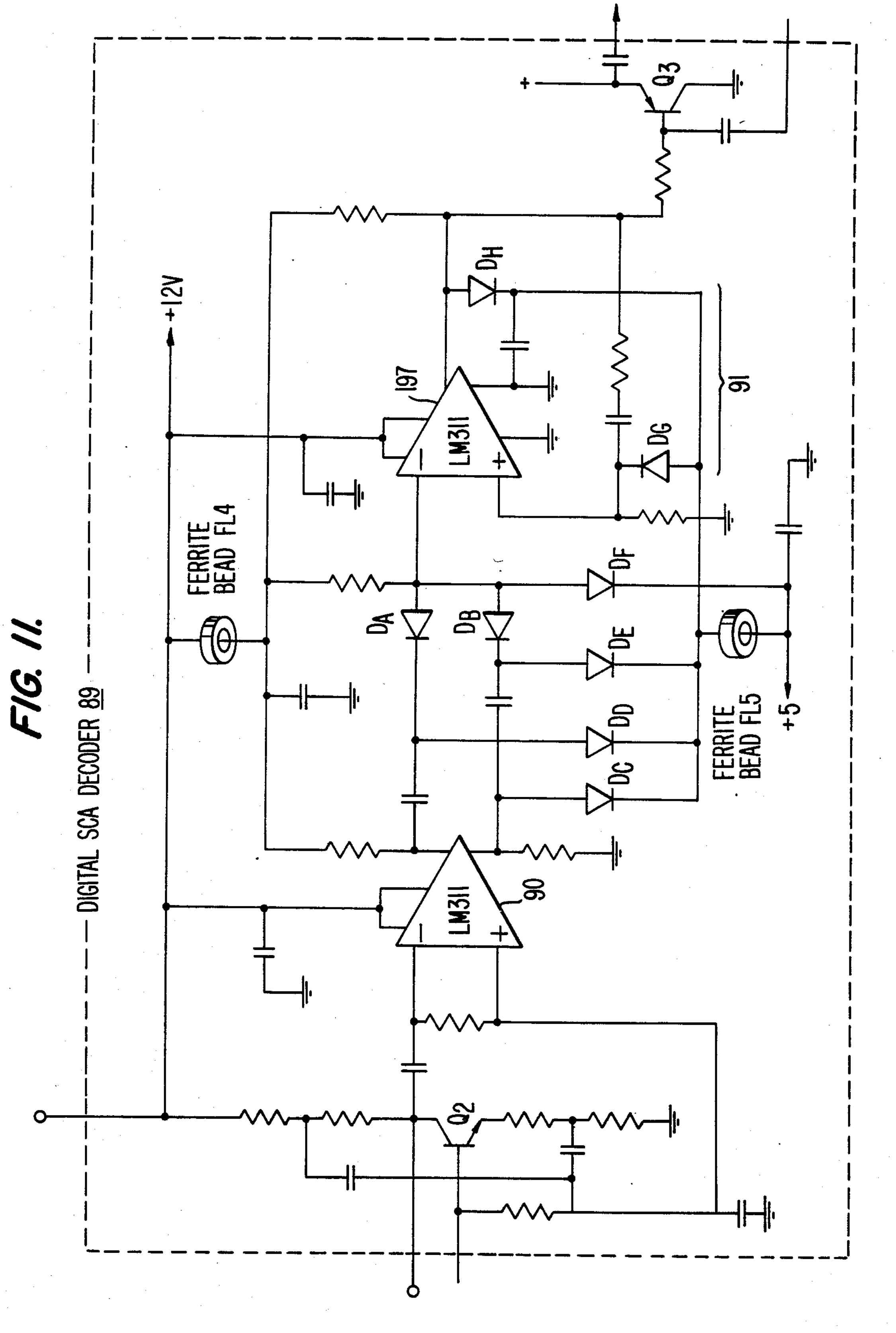
FIG. 11 is a schematic diagram of a digital SCA decoder suitable for use with the present invention.

Referring now to FIG. 11, the digital SCA decoder of the present invention is shown in detail. The input is first amplified through a single stage transistor buffer Q2 and subsequently fed through a precision comparator 90 which is used to sense all the zero crossings of the 67 kHz carrier. These zero crossings are then combined through a group of diodes DA–DF which form an OR gate. This composite signal is then fed to a second comparator 197 which is connected to a mono-stable multivibrator 91. Thus, the output of this circuit is a pulse train of fixed pulse width but with variable time between pulses. Diodes DC through DF are simply used as voltage clamps and are incidental to the operation of the circuit. The same is true of diodes DG and DH. The output transistor stage Q3 of this circuit is used as another amplifier buffer.

Referring now to FIG. 9, the input signal from the telephone line consists of two control tones at 450 Hz and 600 Hz and a ternary frequency shift or TCSK signal which has a 1.4 kHz center frequency and a ±400 Hz deviation. First tracking the decoding of the 400 Hz, the phone signal passes through a high pass filter into a phase-lock loop decoder 565. This restores a copy of the original TCSK signal input from the utility central computer TCSK source, that is a baseband low frequency signal which is low pass filtered to remove any noise components by the 6 pole low pass active filter 71 ("LPF-1"). The TCSK output of that filter is then detected with the comparators 74 and 75 identified as the D0 and D1 comparators respectively whose outputs are D0 and D1 and are essentially reproductions of the D0 and D1 outputs from the utility computer 55 unit.

The function of the rest of the circuit is to regenerate a baseband TCSK signal to be input into the SCA telemetry input of the SCA generator in the broadcast station transmitter. This is accomplished by using the D0 and D1 control signals to turn on and off symmetrical voltages ±V generated by the unit referred to as a differential voltage generator 78. The D0 and D1 outputs select either no voltage input to the 6 pole low pass active filter 182 ("LPF-2"), a plus voltage, or an equal magnitude minus voltage representing the three ternary states. The function of the low pass filter 182 ("LPF-2") is to form the actual TCSK transmit filter or the first half of the symmetrical filter pair which forms the overall band pass transmit/receive filter response for the communications channel. The output of that low pass filter goes directly to the telemetry input of the SCA card of the broadcast transmitter.

The control tones, the 450 Hz and 600 Hz control tones are decoded in this unit to provide two other functions. One of the other functions is that, in the absence of any TCSK signal, it is desirable to apply some modulation if there is no other use, that is, no other co-channel use of the SCA channel because, it is desirable to always maintain some modulation on the SCA channel. The unit referred to as a 400 Hz oscillator (8038) can be used to provide a 400 Hz audio tone to modulate the SCA channel at a low level the if no other modulation is being utilized on the channel at that time. This is done to prevent birdies in the reception of the signal in some user FM receivers on main channel stereocast.

The other purpose of the pair of 450 Hz and 600 Hz tones is that they are also decoded to select between alternate deviation settings for the TCSK signal. This is done in essence through the use of the two circuits 180 and 181 called deviation control which act as a DAC in selecting two alternative voltage levels into the differential voltage generator which then are utilized to provide alternative magnitudes of deviation for the TCSK signal on the SCA sub-carrier broadcast channel.

One of the features of the TCSK receiver approach shown in FIG. 10 is the availability of a command variable threshold level for detection of the TCSK signals. The variable threshold detection of the TCSK signal is desirable because the signal amplitude output from the 6 pole active filter for the TCSK is exactly proportional to the frequency deviation of the TCSK signal on the FM/SCA channel. Under varying circumstances, it may be necessary for co-channel sharing purposes to vary the TCSK signal deviation on this channel for means of minimizing interference with SCA co-channel users. If this were the case, it is desirable to be able to alter the optimum threshhold set point for the receivers without physically visiting each receiver and making alterations or adjustments to the receiver itself.

This capacity is accomplished in this receiver approach by making one of the command structures which is decoded by the 8035 microprocessor change the 1 setting of DAC 193 in FIG. 10. This DAC setting changes a reference current output of the DAC 193 in accordance with the command input to the microprocessor. The function of this DAC current is to generate a pair of voltages which are symmetrically disposed around the voltage $V_{REF}$ (which is 5 volts in the experimental receivers). The magnitude of that voltage is equal to I-DAC×R1 which is also equal to I-DAC×R0 since R0 is equal to R1, and it creates a pair of threshold voltage levels, VL and VU. The incoming signal, the signal from the 6 pole active filter for TCSK 88, is the TCSK signal riding on V-REF and in this manner the VL and VU are then exactly proportional to the difference between V-REF and the proportionality constant established by I-DAC. In this way, it is possible with small SCA deviations to reduce I-DAC and consequently V-DAC to optimize the threshhold for detection with low deviations, or if larger deviations are allowed by the particular SCA operation, to be able to increase the value of I-DAC or V-DAC and optimize for the larger deviations. In general, for typical operating conditions, the optimum threshhold value of V-DAC is approximately 40% of the peak±peak magnitude of the TCSK signal out of the 6 pole active filter 88. FIGS. 18A–D show various waveforms of signals produced during the operation of the receiver shown in FIGS. 10, 11 and 13.

Also shown in FIG. 10 are the relay driver units 198. These fail safe devices are necessitated by the fact that if the load management receiver unit were to fail in the field it might disable a needed appliance and cause an unacceptable maintenance requirement for immediate repair of the unit. In order to avoid this, the relay driver units have been made fail safe so that failure of the receiver, the microprocessor 8035 or other portions of the receiver will not cause the relays to lock-on, that is to de-energize the user's loads, shown as load 1 and load 2 in FIG. 10. This is accomplished by AC coupling the relay drivers 198 through the capacitors C74 from their microprocessor output shown as 36 and 37, respectively, in FIG. 10. In this circuit, diodes CR27 and CR28 with filter capacitor C75 driving Q8 or, diodes CR30 and CR31 with filter capacitor C77 driving Q9 respond only when an AC or squarewave signal is applied from the microprocessor outputs 36 and 37. In the absence of an actual squarewave or pulse signal output these circuit elements, de-energize the relays by removing the base drive the Darlington transistors Q8 and Q9. In this way, failure of the microprocessor to function will lead to an absence of a squarewave signal at those outputs, that is, the outputs at pins 36 or 37 will lock either high or low and the relays RY1 and RY2 will be de-energized leaving the customer's loads, load 1 and load 2, on.

Figure 16A:
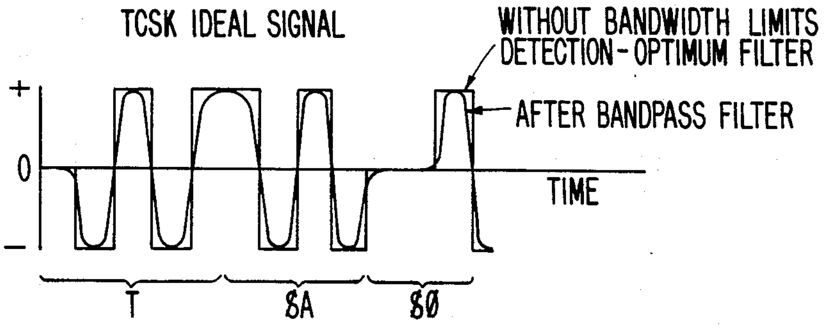
FIGS. 16A–D are approximations of ideal signals processed through the system of the present invention.
Figure 16B:
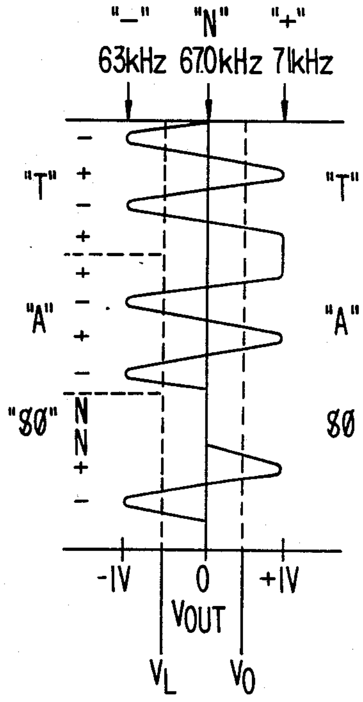
Figure 16C:
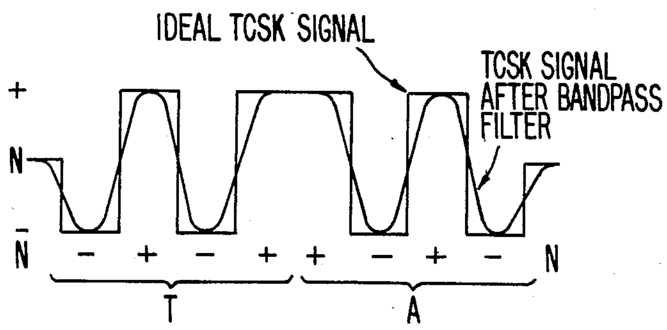
Figure 16D:
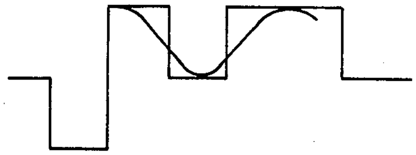

FIGS. 16A–D show several examples of TCSK wave forms both in their ideal (unlimited bandwidth) case and in their practical implementation after band pass filtering. The ideal TCSK signal involves abrupt transitions in the SCA frequency from the "N" or nominal 67 kHz to the plus and minus deviation frequencies in a squarewave pattern. This wave form is similar to the voltage wave form which would be measured at the TCU unit in FIG. 9 at the input to the 6 pole low pass active filter 182 (LPF-2) whereas the smooth output wave form from FIG. 16C is the TCSK signal after passing through a band pass filter and would be similar to the output of the 6 pole active filter 182 (LPF-2) in FIG. 9. The function of filter 182 is to remove undesired high frequency components from the ideal TCSK signal which would interfere with the co-channel use of the SCA channel by MUZAK or other users. Also these high frequency components add virturally no additional information components to the message and are, hence, unncessary in the data transmission.

Figure 17A:
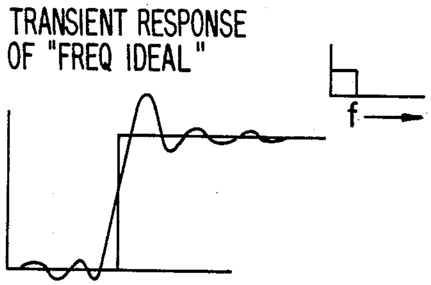
FIGS. 17A and 17B are graphs of transient response possibilities that arise in signal processing with the present invention.
Figure 17B:
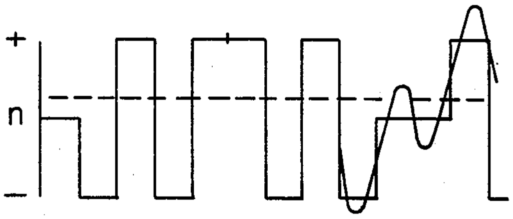
Figure 18:
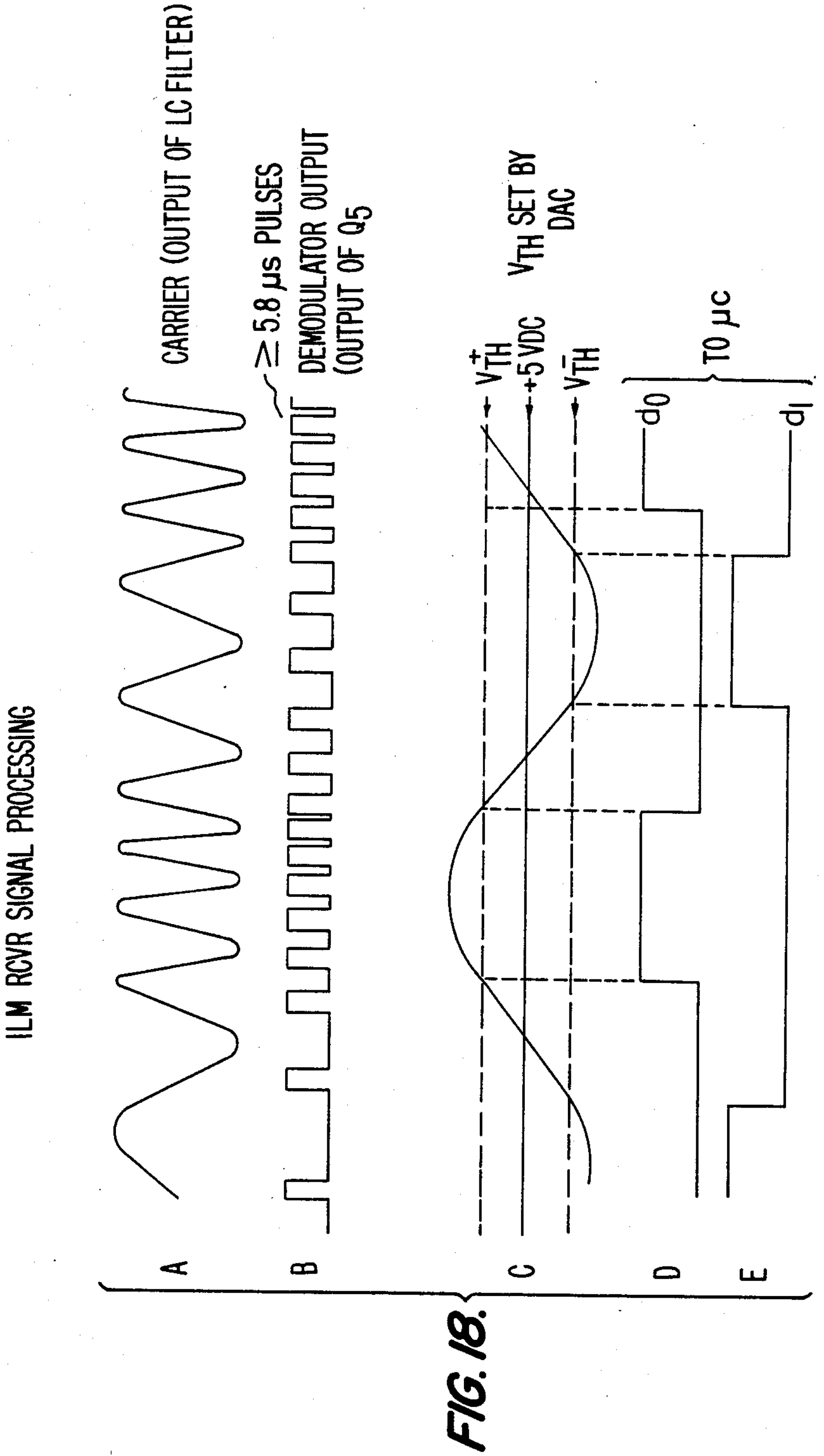
FIGS. 18A through 18E are graphs of the signals as seen in the receiver of the present invention, FIG. 18A being the carrier, FIG. 18B being the demodulator output, FIG. 18C being the average value of the demodulator output, and FIGS. 18D and 18E being the digital TCSK signal recovered therefrom in binary form.

FIG. 16B shows an actual anticipated frequency deviation versus time for the preamble (TA) for a typical TCSK message. The frequency scale in 16B is at the top. At the bottom of FIG. 16B is the signal output expected from the receiver SCA decoder output at would be shown as point 44 for example, in FIG. 10, which is the output of the 6 pole active filter to TCSK. The voltage scale at the bottom of FIG. 16B would be voltages measured relative to the 5 volt V-REF signal on which the TCSK signal lies in the experimental implementations of the load management receiver. FIGS. 1 and 17B show transient response possibilities that arise in practicing this invention.

LP Filters −1, −2 (Bessel)

The following relates to the low pass filter response characteristics, last transmit and the receive for the filters in the system. The filter is an identical three stage low pass filter of the partial Bessel type in each of the transmitted and received sections. The characteristics are as follows: F0 for the first stage is 51.2195121 Hz and D for the first stage is 1.8. The F0 for stage two is 64.0243902 and D for stage two is 1.6. The F0 for stage three is 69.5121951 and D for stage three is 0.8. For the two stages, both for the combined cascaded transmit and receive filter, the 3 dB bandwidth is 30 Hz. The reason that number is selected is that it is slightly more than you need for the TCSK signal.

Figure 12:
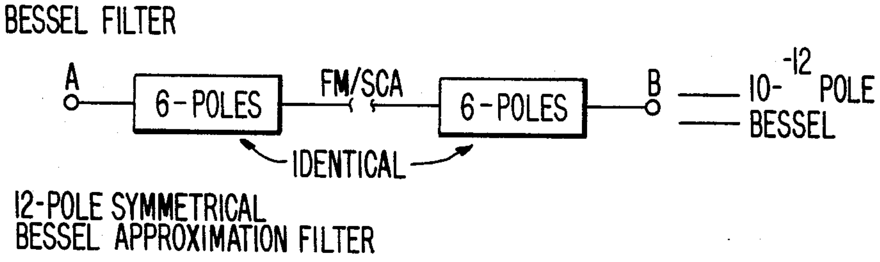
FIG. 12 is a block diagram of a Bessel filter cascade arrangement of the present invention.
Figure 14:
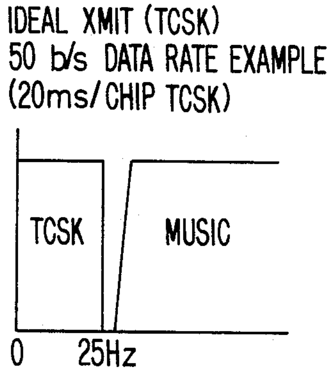
FIG. 14 is a spectrum of an ideal transmit signal for TCSK encoding having a data rate of 50 bits per second.
Figure 15:
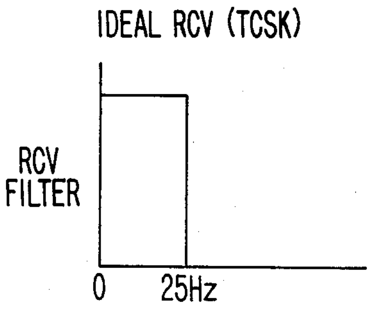
FIG. 15 is an ideal receive filter for TCSK encoding.

These filters bandwidth limit the TCSK signal so that it does not interfere with any other material which may be in the audio spectrum of the SCA channel, for example, from other co-channel users. They remove most of the unnecessary high frequency components from the receiver and remove from the TCSK signal the sharp edges in the time domain. The filter also removes unwanted frequencies. These filters operate in cascade and are based upon the fact that for the transmission of a 50 bit per second data rate, it is not necessary to have energy in the signal beyond 25 Hz. The receive filter is identical to the transmit filter and together they make up a split filter which cascades to form a complete bessel function unit. This is shown in FIG. 12. In contrast, if one were to use a sharp cut-off filter or an ideal filter having a step cut-off at the desired frequency, the result would be unsatisfactory. Instead, in this invention, a filter is placed at the transmit section which, in itself is not particularly well optimized for data reception, and a similar filter is placed at the receive end, which in itself is also not particularly well optimized for data digital response, but together the filters do a good job of keeping noise and co-channel interference out of the signal path. It is found that the three desirable functions of this filtering action can be achieved since, when cascaded they do an excellent job of transient response maintenance while achieving the goal of eliminating co-channel interference from being caused by the TCSK signal at the transmitter and eliminating at the receiver the noise and co-channel signals from interfering with the TCSK.

RECEIVER ADDRESSING

One of the most powerful features of the Load Control Receiver (LCR) is its addressability. The addressing scheme proposed here allows 268 million unique LCR addresses, including the capability to reference large numbers of LCR's according to geography, climate, or any other logical grouping defined by the utility company.

Figure 19:
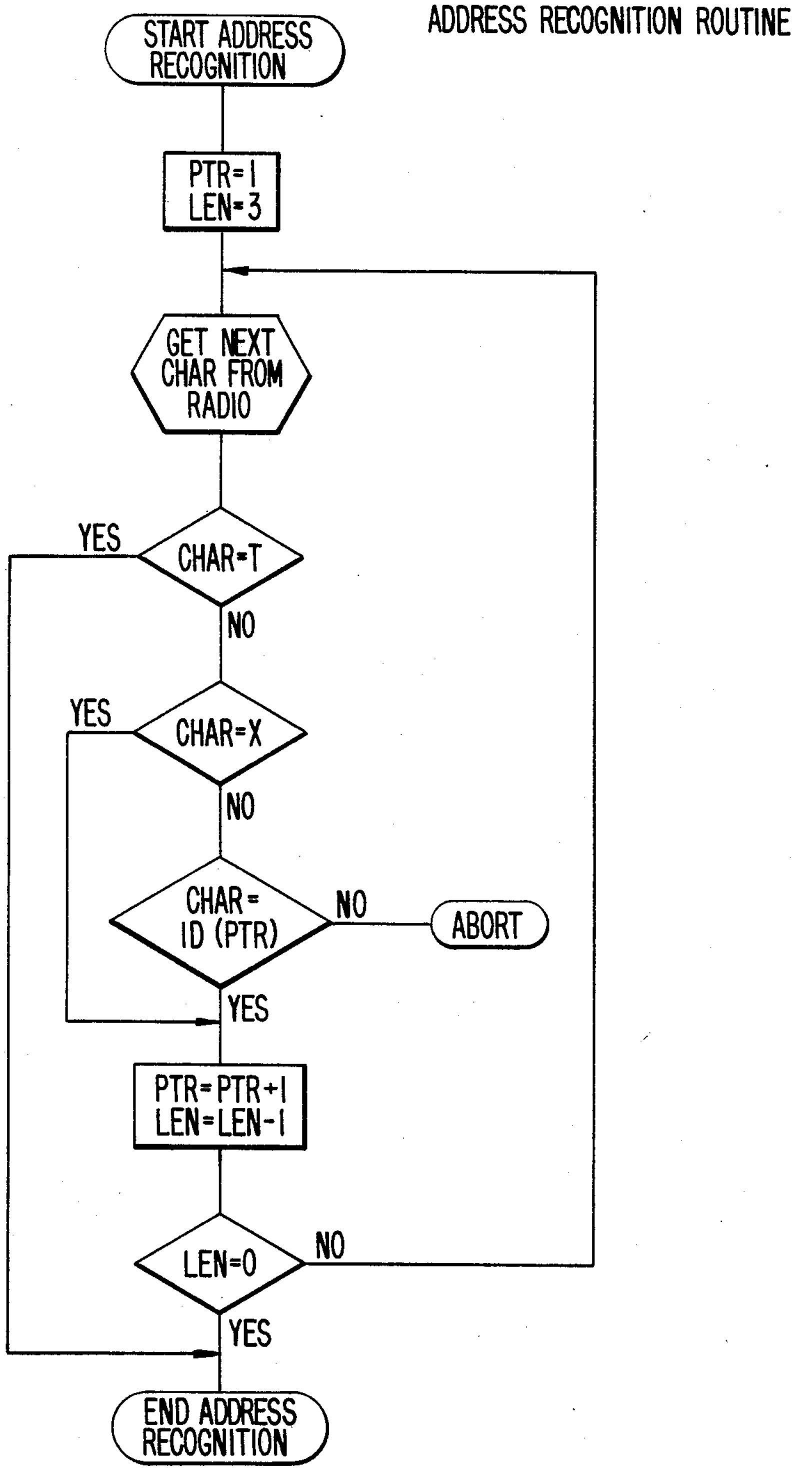
FIG. 19 is an address recognition routine for analyzing the address group of the signal for TCSK construction in accordance with the invention and includes the truncation identification sequence.

With the current protocol design, the address field has a maximum length of nine symbols. The nine symbols have tentatively been identified as the user type, subgroup, substation, and unique ID, but these designations are totally meaningless to the LCR software. The LCR simply contains a string of TCSK symbols which must be compared to the received symbols according to a few simple rules. The LCR's ID consists of strictly hexadecimal symbols (0–F) and may not contain the symbols X, T, or S. If a hexadecimal symbol is received, the received symbol is compared with the LCR's corresponding ID symbol. If the symbols do not match, the message reception is aborted. If the received symbol is an X (don't care), the received symbol is assumed to match any LCR ID symbol. If the message transmitter wishes to send fewer than nine address symbols, the last symbol must be the T (terminator) symbol. FIG. 19 contains the flowchart for the address recognition routine.

Figure 20:
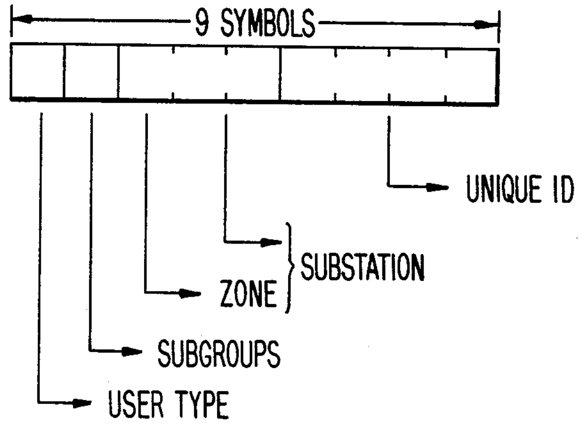
FIG. 20 is an addressing format for the message of FIGS. 5A and 5B.

As described above, the LCR treats its ID as just a sequence of TCSK symbols. The system designer can attach whatever meaning he desires to the various ID symbols without modifying the routine in FIG. 19. While the assignment of the address symbols is entirely at the discretion of the utility company and the system designer, the following is a typical definition for the address field. FIG. 20 depicts this proposed layout.

(1) USER TYPE—A one-symbol field to specify the user type, such as residential, commercial, distribution system, or FEMA.

(2) UTILITY SUBGROUPS—A one-symbol field to designate one of sixteen different logical groupings defined by the utility company.

(3) SUBSTATION—A three-symbol field to designate one of 4096 substrations. This field could be decomposed in such a way that the first symbol of the substation ID indicates the geographical zone of the substation. The remaining two symbols of the substation ID could reference up to 256 substations within a zone.

(4) UNIQUE DEVICE ID—A four-symbol field to allow up to 65536 LCR's to be attached to a single substation.

With the truncated addressing scheme, the order of these fields is very important. To minimize the average message length, the most commonly used address field should be specified first, the next most commonly used field should be second, etc.

TIME-OF-DAY

Contained within the 8035 microcomputer 190 in FIG. 10 is an 8-bit timer that ticks at a 12.5 KHz rate, or once every 80 usec. It is this timer that determines when to sample an incoming message. Because this timer is very stable and accurate (controlled by the system's 6 MHz crystal), the timer is used as the basis for the LCR's time of day clock. Because the basic TCSK chip time is 10 msec, the timer is forced to expire once every 10 msec. By counting 100 chip intervals the microcomputer can determine when one second has expired. One minute is obviously recognized after counting 60 seconds. One day consists of counting 1440 minutes. Thus, by using the 8035's internal timer the LCR can determine the time of day with a precision of one minute.

The one difficulty with using the 8035's timer is that the timer is modified at the very beginning of a message. The process of synchronizing with the preamble entails four separate adjustments to the timer. Such manipulations disrupt the orderly 10 msec expiration process and consequently disrupt the process of keeping time. Fortunately the results of the manipulations are well understood and it is possible to compensate for the accumulated error.

Figure 21:
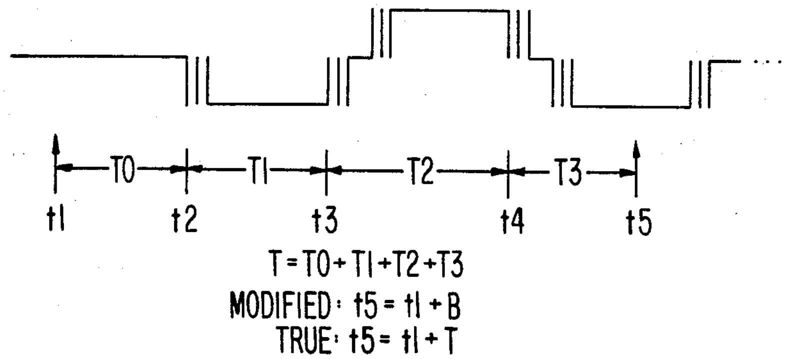
FIG. 21 is a fraction accumulator for the message of FIGS. 5A and 5B and operates to keep track of preamble time.

FIG. 21 illustrates the timing adjustments which must be made at the beginning of the preamble. FIG. 21 depicts the timer expiring at time t1. After a delay of T0 (at time t2), the first preamble chip begins and the timer is set to zero. The end of the first preamble chip occurs at time t3 after a delay of T1 and the timer is again set to zero. At time t4 the timer is adjusted to expire at time t5 after a delay of T3. If the number of timer ticks per chip is B, and the total time $T = T0 + T1 + T2 + T3$, then an unmodified clock would have $t5 = t1 + T$. Because of the synchronization process, the clock at time t5 will only have a value of $t1 + B$. Thus, after the rough synchronization at the start of the preamble, the amount T-B (always positive) must be added to the clock. If T-B were always an integral multiple of B, the necessary adjustments could be made by incrementing the LCR's 10 msec counter. Instead it is necessary to define a "timer fractional accumulator" which holds the sum of the fractional adjustments. Periodically the accumulator is tested to see if the sum is greater than B. If so, the LCR's 10 msec counter is incremented and B is subtracted from the fractional accumulator. At the end of the preamble a value called delta is added to the timer to complete the synchronization and delta must also be added to the fractional accumulator.

All references to the "time of day" refer to a minute clock. The system defines midnight as having a time of zero, 1:00 a.m. has a time of 60, and so on. When the LCR's clock reaches 1440, the clock is reset to zero. In order to store the time of day clock and store delay parameters up to 24 hours, two 8-bit bytes are required. (One byte will store numbers up to 255 while two bytes will hold 65535). When transmitting a time parameter in a TCSK message, the time of day can be specified in three symbols representing 12 bits.

COMMANDS

Figure 22:
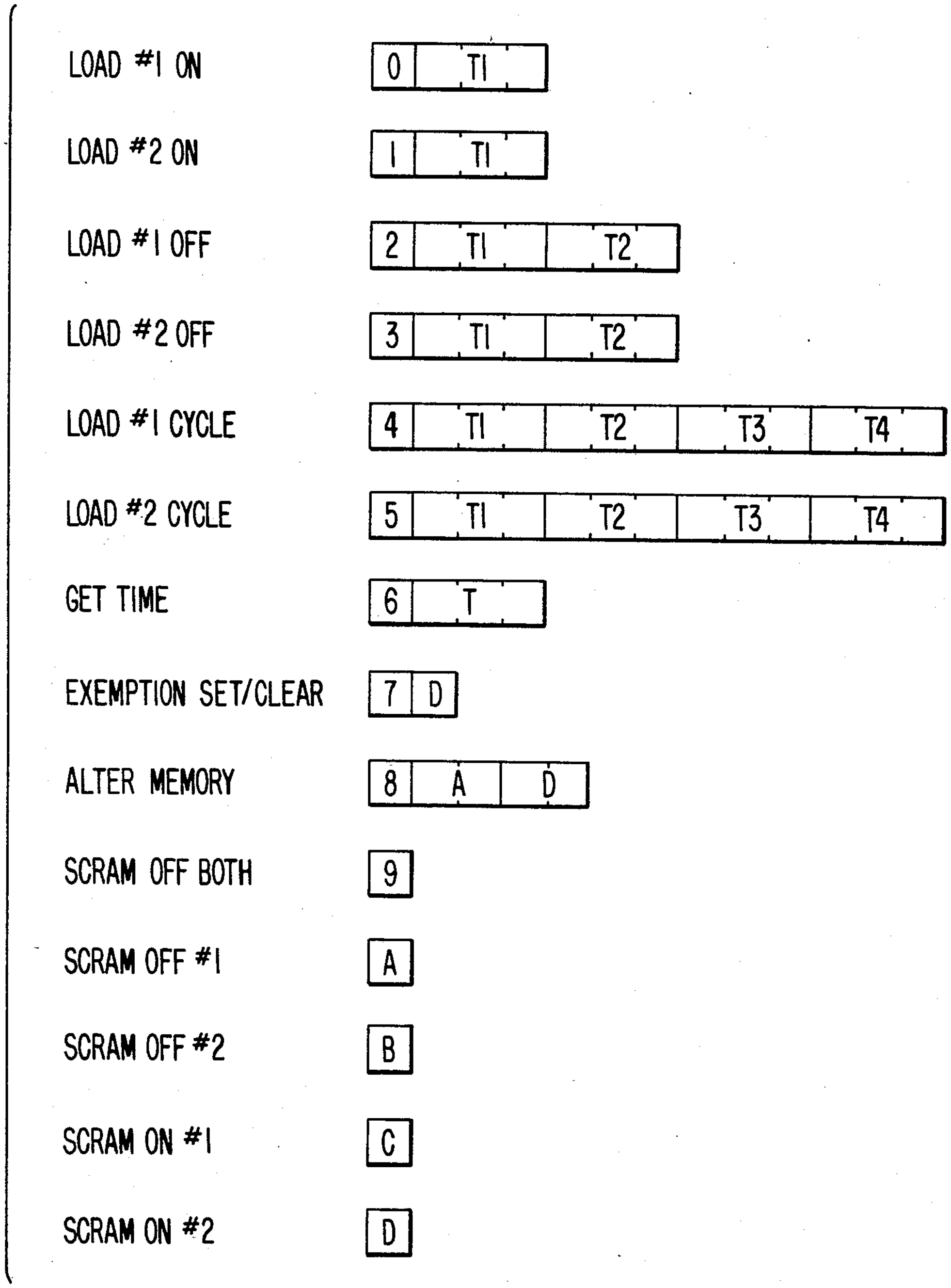
FIG. 22 is a format structure for the command portion of the message.

The following section defines all of the commands that can be sent from the MCC 10 to the LCR. The command structure allows up to sixteen different commands, although only fourteen are currently defined. FIG. 22 depicts the fourteen defined commands and the amounts of data required with each command.

At any time each load in the LCR is in one of five different states: "on indefinitely", "on, waiting to turn off", "on, waiting to cycle", "off, waiting to turn on", and "cycling". The execution of a received command is frequently dependent on the load's status at the time of reception. There are many command/status combinations which are nonsensical or contradictory. For example, if the LCR is "off, waiting to turn on" and it receives a command telling it to turn off in five minutes, the LCR has three basic options. First, the LCR could remain off for the next five minutes. While this is an easy approach, it does not exactly accomplish the intended action of turning off in the future. Second, the LCR could turn itself back on so that it can turn off in the future. This action, though, seems strangely backwards, i.e., the reception of a "load off" command causing the load to be turned on. The third approach open to the LCR is to just ignore a command if there is no obvious way to perform the command which has been elected.

LOAD ON COMMAND

Commands 0 and 1 turn on loads at a specified time. These commands are ignored if the status is not "off, waiting to turn on". Following the command symbol are three symbols representing the time of day T1 at which the load is to be turned on. If T1 is less than (earlier in the day) the current time, the command is ignored. If the command is to be accepted, a random number is selected from 0 to 3 and added to T1. This new on-time is stored in the LCR memory and the status remains "off, waiting to turn on."

When the current time becomes greater than, or equal to, the stored on-time, the load is turned on, the corresponding LED is turned off, and the status for that load becomes "on indefinitely."

LOAD OFF COMMAND

Commands 2 and 3 turn off the loads at a specified time. These commands are ignored if the load status is "cycling" or "off, waiting to turn on". Following the command symbol are six symbols representing the turn-off time T1 and the subsequent turn-on time T2. If T1 is less than (earlier in the day) than the current time, the command is ignored. If the command is to be accepted, a random number is selected from 0 to 3 and added to both T1 and T2. These modified off and on times are stored in the LCR memory and the status is changed to "on, waiting to turn off."

When the current times become greater than, or equal to, the stored off-time, the load is turned off, the corresponding LED is turned on, and the status for that load becomes "off, waiting to turn on."

CYCLE COMMAND

Figure 23:
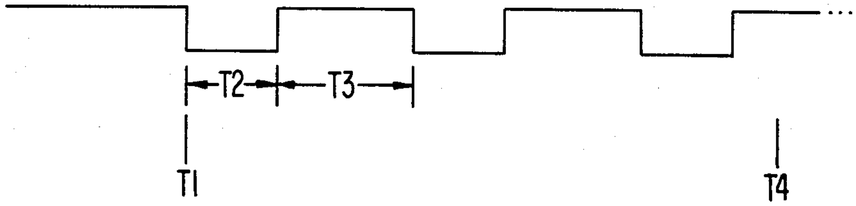
FIG. 23 is a cycle timing diagram for analyzing the various times used in the timing command.

Commands 4 and 5 cycle the loads at a specified duty cycle for a specified amount of time. These commands are ignored if the load status is "off, waiting to turn on". The command symbol is followed by twelve symbols to specify the four parameters shown in FIG. 23. To fully specify a cycling strategy, one must define the time T1 at which the cycling is to begin, the duty cycle parameters (T2 is the off duration and T3 is the on duration), and the time T4 to end the cycling.

If the cycle command is received while the load is already cycling, the command will only be accepted to change the ending time. That is, the LCR ensures the received start time is equal to, or less than, the current time, and the received duty cycle parameters are identical to the stored parameters. If the ending time is larger than the current time, the new ending time is stored and the load status remains unchanged.

If the load status is "on . . . ", the command is accepted if the cycle start time is greater than the current time. If the command is accepted, a random delay from 0 to $T2+T3$ is generated and added to the starting and ending times of the cycle command. Maximum diversity is retained by injecting a random delay varying over the entire cycle time. By delaying both the starting and ending times all LCR's in the system are treated "fairly" and are controlled for exactly the same amount of time. After storing the starting and ending times and the duty cycle parameters, the load status is changed to "on, waiting to cycle."

The random number is generated by dividing a large time-dependent number by the sum $T2+T3$. The large number is obtained by multiplying the least significant clock byte (count of 10 msec timer expirations) by 257. Multiplication by 257 is easily accomplished by moving the clock byte into both halves of a 16-bit number. This large number is then divided by the sum $T2+T3$. The quotient is discarded (in fact the quotient is never even generated) and the remainder of the division is a pseudorandom number between 0 and $T2+T3-1$, inclusive.

When the current time becomes equal to, or greater than, the cycle start time, the off duration parameter is moved into a temporary half-cycle counter and the load is turned off, the corresponding LED is turned on, and the status becomes "cycling". Every minute thereafter the half-cycle counter is decremented. When the counter reaches zero, the on duration parameter is moved into the half-cycle counter and the load is turned on. Again, the counter is decremented every minute. While the load is on, the cycle ending time is frequently being compared with the current time. When the current time surpasses the ending time, the LED is turned off and the status becomes "on indefinitely."

TIME UPDATE COMMAND

As described above, the LCR will count expirations of its internal timer in order to keep track of time. While the timer frequency is very stable, it does not provide a sense of absolute time. That is, if the LCR is told when it is exactly 12:00, the LCR can easily count 360,000 expirations of its timer to determine when it is 1:00. But it is the responsibility of an external source (such as the MCC) to periodically inform the LCRs of the absolute time of day.

Command 6 is used to define the absolute time in the LCRs and is followed by three symbols representing the time of day with one minute accuracy. By not defining the lower two bytes of the timekeeping divide chain, the LCRs maintain a randomness over 1 minute to aid in the retention of diversity.

Once an LCR knows the correct time, it will be able to maintain near-perfect timing as long as power is applied. When an LCR begins executing from a power-up restart, the time is assumed to be midnight. To ensure the entire network knows the time of day, the MCC should transmit a time update command on a periodic basis, perhaps every 30 minutes. If the MCC suspects there has been a power failure and restoration somewhere in the network, the time update could be transmitted more frequently.

EXEMPTION COMMANDS

In a large load management system, it will frequently be desirable to exempt one or more LCR's from control. Some of the exemptions will be for only one day, e.g., for uninterrupted service during a party, while other exemptions will be for an indefinite amount of time, e.g., when a new owner moves into a controlled house. Command 7 allows the loads attached to an LCR to be exempted for one or more days.

The command symbol is followed by one symbol defining the exemption operation to be performed. The four possible operations are: set daily exemption, clear daily exemption, set indefinite exemption, clear indefinite exemption. When a daily exemption is set, the LCR will ignore all further "load on", "load off", and "cycle" commands until either a "clear daily exemption" command is received or the daily exemption is automatically cleared at midnight. When a daily exemption is cleared, the LCR returns to accepting the load control commands. The indefinite exception command similarly causes the LCR to ignore the load control commands, but an indefinite exemption is not cleared at midnight.

The indefinite exemption commands are assumed to override any daily exemptions commands. If an LCR has an indefinite exemption, only a "clear indefinite" command will remove the exemption and a "daily clear" command will be ignored.

ALTER MEMORY

In order to alter temperature thresholds, DAC levels, or any other operating parameter stored in the LCR RAM, command 8 allows the MCC to alter any location in the 8035 RAM. The command symbol is followed by four symbols, where the first two indicate the address of the memory location to be changed and the last two symbols represent the byte of data to be stored at that location.

SCRAM COMMANDS

Command 9 is designed to shed all the loads as quickly as possible. When an LCR receives a "scram off" command, it will turn off both loads immediately. Commands A and B individually turn off loads #1 and #2, respectively.

Commands 9, A, and B all have built-in 2 hour timeouts. When a scram off command is received, the appropriate load(s) is turned off, the corresponding LED(s) is turned on, the status becomes "off, waiting to turn on", and the turn-on time is selected to be 120+RND(0,3) minutes into the future. If the scram emergency persists longer than two hours, the MCC need only send another "scram off" or a simple "load on" command. If the scram emergency is resolved in less than two hours, the MCC should transmit a "load on" command with an appropriate on-time.

Commands C and D turn on one of the loads immediately. To prevent large transients, the "scram on" command would not normally be transmitted to large numbers of LCR's. Rather these commands will probably be reserved for LCR's in the distribution system or an agricultural application.

CHECKSUM

The TCSK transmission scheme inherently contains a large amount of noise immunity. A TCSK symbol consists of four ternary chips. Of the 81 possible four-chip symbols, only 19 are legal. Because the Hamming distance between any two TCSK symbols is at least two, a single chip error in any symbol will always be detected. Finally, the preamble of a message must be preceded by at least 10 consecutive chip times of neutrals. In a very noisy environment, it is unlikely the consecutive neutrals could be detected.

With the noise immunity just described, it is unnecessary to utilize an exceptionally powerful checksum scheme. The LCR currently uses a simple 8-bit sum of the decoded TCSK symbols. When this sum overflows (causes a carry out), the sum will be incremented by one. This simple checksum, in concert with the other TCSK features, will provide more than adequate protection against false alarms.

RESET

When the LCR performs a power-on reset, it performs the following initialization sequence.

(1) Set clock to midnight
(2) Set DAC to its default level
(3) Turn off loads for a random time from 4 to 7 minutes
(4) Turn on LEDs
(5) Set status for both loads to "off, waiting to turn on"

Preamble Synchronization Algorithm

A message preamble consists of two symbols (TA) which represent eight TCSK chips (−+−++−+−). Following the preamble are dozens of chips comprising the message data. Because all messages arrive at the receiver asynchronously, the receiver has no a priori knowledge of chip locations. Because the TCSK chips are not self-clocking and are deformed differently depending on preceding and succeeding chips, the receiver must acquire chip synchronization during the message preamble. After reception of the preamble and determination of the optimal sampling times, the chips in the data portion of the message are read solely on the basis of a clock internal to the receiver. The process of "synchronization" thus consists of scanning the preamble and adjusting the receiver's internal timer such that the timer will expire at exactly the optimal sampling times of the subsequent data chips.

The synchronization algorithm described in this paper is based on a few assumptions. First, the receiver is assumed to know the exact bit interval. (The unknown factor is the bit "phase".) Second, the carefully selected preamble is assumed to have a very symmetrical waveform at the receiver. When noise is added to the preamble waveform, the basic symmetry is retained but some of the chip transitions will be shifted slightly forward or backward in time. The third assumption in the synchronization algorithm is that the sum of all the time shifts has a zero mean.

Figure 24:
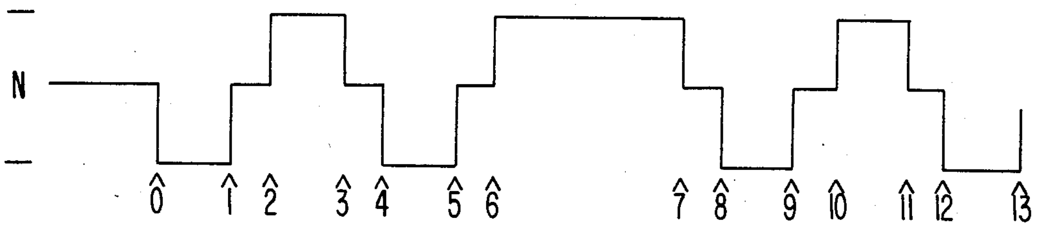
FIG. 24 is a preamble wave form.

FIG. 4 depicts the ideal preamble waveform and demarks fourteen chip transitions which could potentially be measured in the synchronization process. It is fairly easy to show that timing measurement #$\phi$ is shifted forward in time with respect to the other preamble measurements and thus does not meet the preamble symmetry assumption. Timing Measurement #13 in FIG. 24 does not always represents a chip edge. If the first data chip is minus, measurement #13 cannot be made. Thus, the synchronization algorithm will only use measurements #1 through #12.

Due to the assumption of preamble symmetry, the middle of the second preamble chip is assumed to be halfway between measurements #2 and 190 3. Similarly, the middle of the third preamble chip is assumed to be halfway between measurements #4 and #5. The synchronization process begins by making a reasonable guess as to the location of the center of the preamble chips. As the twelve timing measurements are made, an error function is accumulated indicating whether the initial guess was ahead or behind the true chip centers. After the twelfth measurement, the error function is added to the timer to ensure proper synchronization on the subsequent data chips.

The 8035 microcomputer contains an eight bit timer which increments every 80 μsec. When the timer increments from 255 to 0, the timer generates an interrupt to the CPU. If the algorithm calls for an interrupt every B ticks of the timer, the CPU must reset the timer to a value of 256−B (or −B) in the interrupt routine. Thus, the timer continually ramps up from −B to zero, is reset to −B, and ramps up again. At any time, the CPU can read the timer and get a value between −B and 0.

Figure 25:
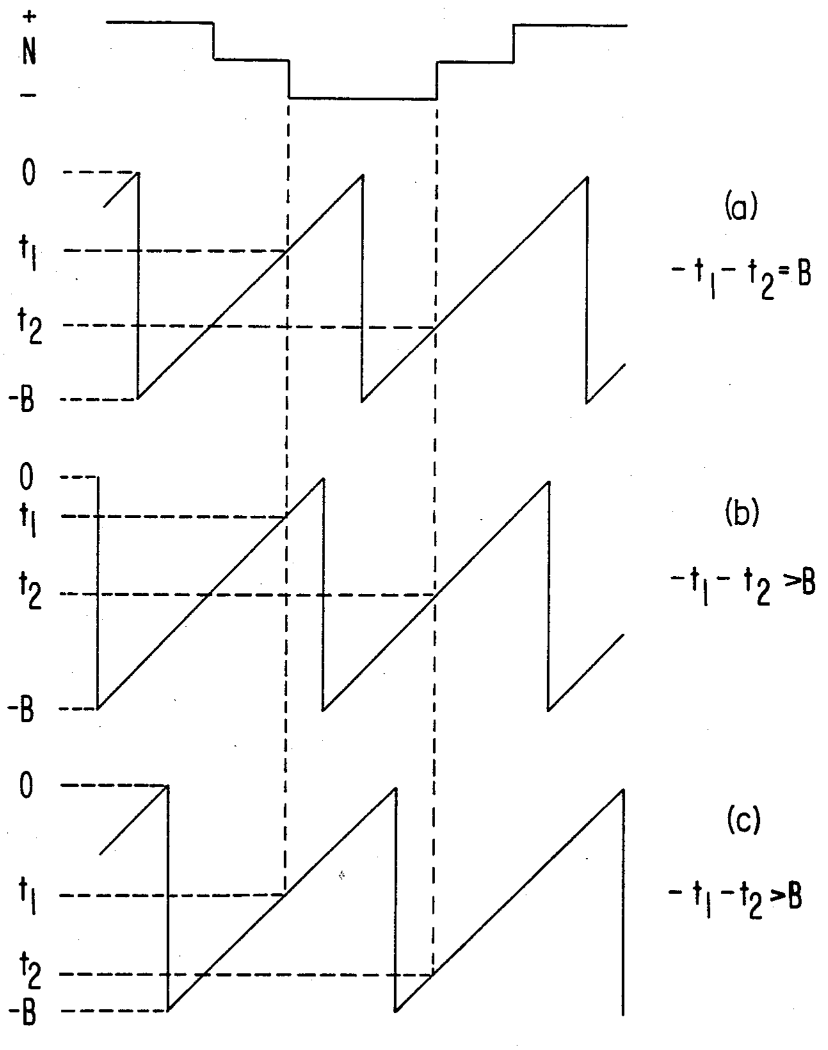
FIG. 25 is a timing diagram of a preamble synchronization procedure in accordance with the present invention.

FIG. 25 illustrates the timer values for three different synchronization situations. In FIG. 25*a*, the timer is exactly synchronized and reaches zero at the exact center of the chip. The timer values at the rising and falling edges of the chip are $t_1$ and $t_2$, where $t_1$ and $t_2$ are both negative 8-bit numbers. FIG. 25*a* graphically shows that, when the timer is synchronized, $-t_1-t_2$ exactly equals the bit time B. It should be noted this equality is true regardless of the chip width. In FIG. 25*a*, the timer reaches zero before the center of the chip and $-t_1-t_2$ is less than B. In FIG. 25*c*, the timer is late and $-t_1-t_2$ is greater than B.

The obvious error function E shall be defined as $E=-B-t_1-t_2$. When $E=0$, the timer is synchronized. When $E<0$, the timer is ahead of the chip center by a time equal to $\Delta=-E/2$ ticks of the clock. When $E>0$, the timer is delayed past the chip center by a time equal to $\Delta=E/2$ ticks of the clock. To correct the timer, one must add the value Δ to the current timer value. (The timer is read, the value E/2 added and the resultant sum is written back into the timer.)

When the error function is accumulated over several chips, all of the individual error functions are averaged together. For example if measurements are made over N chips, the cumulative error function is calculated as follows:

$$E_i = -B - t_{i1} - t_{i2}$$

$$E = \left(\sum_{i=1}^{N} E_i\right) / N$$

$$= \left(-N * B - \sum_{i=1}^{N} t_{i1} - \sum_{i=1}^{N} t_{i2}\right) / N$$

-continued $$= \left(-N * B - \sum_{i=1}^{2N} t^i\right) / N$$

The time $t^i$ is one of the 2N timer values read. As described above the timer adjustment Δ still equals E/2.

The synchronization algorithm described so far requires pairs of time measurements on two edges of a single chip. In the preamble shown in FIG. 24, it is easy to see four timing pairs (2-3, 4-5, 8-9, and 10-11). With a little thought, one can see that measurements 6 and 7 can be paired. The timer should reach zero twice between measurements 6 and 7, but the resulting error function is perfectly valid. Finally, with even more thought, one can see that measurements 1 and 12 can be paired.

Thus, after taking 12 time readings ($t^1$ to $t^{12}$) comprising N=6 pairs, the resultant timer adjustment is:

$$\Delta = \left(-6 * B - \sum_{i=1}^{12} t^i\right) / 12$$

In the 8035 receiver program, the adjustment Δ is initialized with −6*B at the onset of the preamble. As each of the subsequent twelve chip edges occur, the timer is read and the value subtracted from the Δ accumulator. After the twelfth edge, the Δ accumulator is divided by 12 and added to the timer.

The process of "synchronization" entails scanning the preamble and adjusting the receiver's internal timer such that the timer will expire at exactly the optimal sampling times of the subsequent data chips. As described above, at the beginning of the preamble, a good guess is made to roughly synchronize the timer. As the remainder of the preamble is received, the times of chip transitions are measured and used to accumulate a synchronization error function. If B is the number of timer counts per TCSK chip, Ti is the i-th transition time, and 2N chip transitions (leading and trailing edges of N chips) are measured, the accumulated error function Δ is defined by the following equation.

$$\Delta = \left(-NB - \sum_{i=1}^{2N} Ti\right) / 2N$$

Figure 26:
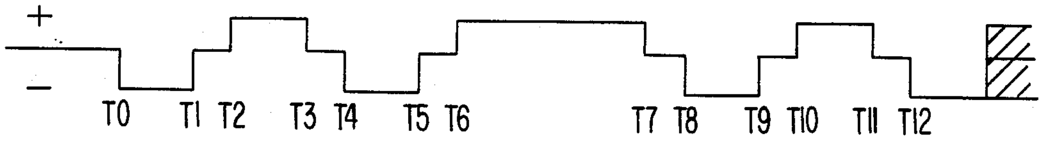
FIG. 26 is a TCSK wave form for a preamble emphasizing the preamble edges.

A synchronization routine in the LCR was implemented which worked well in a noise-free environment with optimal TCSK comparator levels. Referring to FIG. 26, rough synchronization was acquired based on T0 alone (the leading edge of the first preamble chip) and accumulated the error function by measuring T1 through T12. Rough synchronization is acquired by loading a value into the timer to force an interrupt at a particular time in the future.

Due to the filtering of the TCSK signal, the first preamble chip is not symmetrical. With a chip duration of 10 msec, the first preamble chip was as much as 14 msec long while the other preamble chips were roughly 8 msec long. In the first routine, rough synchronization is achieved by forcing the timer to expire 7.5 msec after the leading edge of the first preamble chip. With the comparator levels used at that time, this fixed delay worked quite well.

LCRs have been extensively tested to determine their sensitivity to the existence of noise and suboptimal comparator levels. During this testing it became obvious the synchronization routine was too sensitive to the comparator levels. The testing demonstrated comparator levels which yielded a perfectly acceptable TCSK waveform with the first preamble chip only 6 msec wide. Obviously use of a fixed 7.5 msec delay would not achieve rough synchronization.

Examination of the TCSK preamble revealed that, although the first chip varied drastically in width and symmetry, the second preamble chip was always roughly symmetrical about its center. Thus the new preamble algorithm uses the midpoint of the second chip to acquire rough synchronization. After acquiring rough synchronization, the routine measures the subsequent 8 chip edges (T3 to T10 in FIG. 26) to accumulate the error function. Because the 8 measured transitions are symmetrically placed about the center of the preamble, the synchronization errors are more likely to cancel out. By selecting 8 rather than 12 measurements, the division process is reduced from 76 bytes to 12 bytes.

Figure 27:
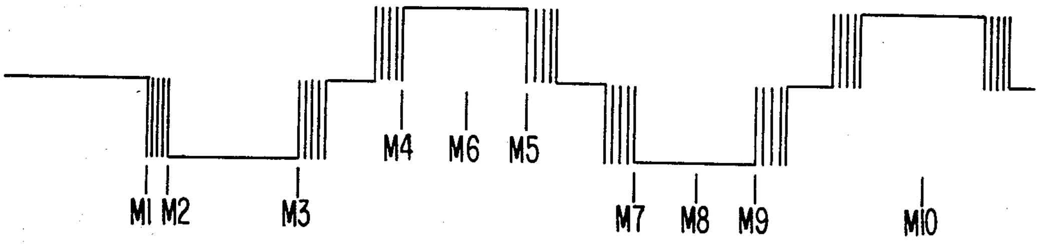
FIG. 27 is an expanded view of the start of the preamble of FIG. 26.

When one enters a noisy environment, the TCSK chip edges sometimes have multiple transitions (as shown in FIG. 27). These extra pulses near chip edges may vary from 10 usec in width (comparator oscillation) to a few hundred usec (audio noise). The transitions which are to be measured and included in the error function are those bounding the long steady portion of each chip.

The preamble in the current design contains 8 TCSK chips (−+−++−+−). This sequence of chips, while always appearing at the start of a message, could appear in the middle of a message. Thus the receiver, before searching for the preamble, must ensure it is in the gap between messages. The intermessage gap is indicated by at least 10 consecutive chip times of neutrals. (It is impossible to have more than four consecutive neutrals in a valid message.)

Once the intermessage gap has been located the LCR loops waiting for the first negative TCSK chip (D0=1). If a positive pulse (D1=1) is encountered, it must be a noise spike and the LCR returns to looking for the intermessage gap. When the first preamble chip begins (denoted M1 in FIG. 27), the LCR's internal timer is set to expire in 20 msec, or 2 chip periods. The first preamble chip is said to have occurred when the signal stays negative for at least 2 msec. If the first chip is not completed before the timer expires, the LCR aborts the reception and returns to looking for the intermessage gap. At time M3 in FIG. 27, the timer is again set to expire in 20 msec. The second preamble chip is said to have occurred when the signal stays positive (D1=1) for at least 2 msec. If the second chip is not completed before the timer expires, the LCR aborts that reception and returns to looking for the intermessage gap. At the end of the second preamble chip, the timer contains the value M5 and the value M4 is stored in a CPU register. The quantity T1=(TIMER-M4)/2 is calculated and represents half the width of the second preamble chip. Because the middle of the second preamble chip (M6 in FIG. 27) is the benchmark for the rough synchronization, the timer must be made to expire at M8, which is exactly one chip period after M6. This is accomplished at time M5 by setting the timer to −B+T1. To begin accumulating the error function, Δ is initialized to −4B and the timer value is subtracted from Δ.

After the second preamble chip, the next seven preamble chip edges are measured and accumulated in the error function. The various rising and falling edges are measured with four subroutines: D0RISE, D0FALL, D1RISE, and D1FALL. After the seventh edge is measured, the accumulated error function is divided by eight by shifting right three bits while extending the sign bit. When the divided error function is added to the timer, the timer is considered "synchronized" with the remainder of the incoming message.

The final step in the preamble processing routine is to ensure the final preamble chip is negative.

FIGS. 28A–C are flow charts of the synchronization process.

We claim:

1. A load management system for controlling a plurality of user loads in a utility electrical power system containing a transmitter which sends a modulated radio wave signal to a plurality of receivers, each of which is connected to a different electrical load and includes means responsive to the modulated radio wave signal for controlling the load connected to the receiver comprising:

means for transmitting a signal in a ternary character shift keying (TCSK) code, said TCSK-coded signal including a control sequence with a preamble, an address identifier, a command signal, a data signal containing information for execution of the command signal, and a checksum signal; and wherein each said load controlling means includes means for receiving and decoding said TCSK-coded signal;

means coupled to said receiving and decoding means, for generating a data sync signal from said preamble, for generating a user enable signal from said address identifier, for generating a specific operating routine in response to said command signal, for processing said data signal in response to said command signal in accordance with said routine, for computing a checksum value from said TCSK-coded signal, for comparing the checksum signal with the computed checksum value, and for disabling said controlling means whenever said checksum signal and computed checksum value disagree.

2. The load management control system in claim 1 in which said TCSK code includes a symbol the transmission of which indicates a truncate command, and wherein each of said plurality of receivers includes means responsive to said truncate command to shorten transmission and reception times.

3. The load management control system in claim 1 in which each said load controlling means comprises a microprocessor to generate load control signals.

4. In a load management system for controlling a plurality of user loads in a utility electrical power system containing a transmitter which sends a modulated radio wave signal to a plurality of receivers each of which is connected to a different electrical load an includes means responsive to the modulated radio signal for controlling the respective load comprising:

means for transmitting via radio waves a signal in quadrature phase shift keying (QPSK) code;

means in each of said receivers for receiving and decoding said QPSK-coded signal into a binary digital signal, said coded signal including a control sequence with a preamble, an address identifier, a command signal, a data signal containing information for execution of the command signal, and a checksum signal; and means in each said receiver coupled to said receiving and decoding for generating a data sync signal from said preamble, for generating a user enable signal from said address identifier, for generating a specific operating routine in response to said command signal for processing said data signal in response to said command signal, for computing a checksum value from the coded signal, for comparing the checksum signal with the computed checksum value; and for disabling said load control functions whenever said checksum signal and checksum value disagree.

5. An electrical power control transmission system for communicating data, said transmission system comprising:

a transmitter for transmitting said data, said transmitter including a ternary character shift keying (TCSK) generator for encoding said data as a series of ternary bits and for transmitting a different frequency for each state of said ternary bits; and a receiver coupled to said transmitter over a communication channel for receiving said transmitted data, said receiver including an electrical load, power relays for controlling said electrical load, means for decoding said transmitted data into baseband data stream for operating said power relays to switch said electrical load, and a fail safe circuit coupled to said relays and said decoding means to prevent improper operation of said system in case of system failures.

6. The communication system in claim 5 wherein said receiver includes a microprocessor, and said fail safe circuit includes a charge pump capacitor input into which the microprocessor continuously supplies a series of pulses to maintain said fail safe circuit in a microprocessor-controlled state.

7. A system for communicating data comprising a transmitter for transmitting said data, said transmitter including a ternary character shift keying (TCSK) generator for encoding said data as a series of ternary bits and for transmitting a different frequency for each different state of said ternary bits; and a receiver coupled to said transmitter over a communication channel for receiving said transmitted data, said receiver including a digital decoder for decoding said transmitted data and recovering a baseband data stream, zero crossing generator means for developing a series of first pulses each corresponding to a different rising and falling edge of said baseband data stream, pulse generator means responsive to said first pulses for generating a series of second pulses having uniform characteristics, each of said second pulses corresponding to a different one of said first pulses, and means for generating a signal representing the average strength of said first pulses.

8. The communication system in claim 7 wherein said pulse generator includes means for generating pulses having constant width whose frequency varies as a function of the zero crossing pulses received, and wherein said receiver further includes amplitude detection means for generating a baseband amplitude signal to the frequency the frequency of said pulses.

9. A load management system for controlling a plurality of user loads in a utility electrical power distribution system including a transmitter which sends a radio wave signal to a plurality of receivers each of which is associated with a different one of said user loads, said transmitter including a computer, a radio wave transmitter, and a communication link connecting said computer to said radio wave transmitter, said radio wave transmitter including means for generating a ternary character shift keying (TCSK) encoded signal from binary outputs of said computers, said encoded signal consisting of 4 bit ternary chips; each said receiver including means for decoding said TCSK encoded signal into a digital signal, and means for processing said digital signal.

10. A system for communicating data comprising:

a transmitter for transmitting said data, said transmitter including a ternary character shift keying (TCSK) generator for encoding said data as a series of ternary bits and for transmitting a different frequency for each different state of said ternary bits, and first means for filtering said data stream to reduce the energy outside a predetermined frequency range necessary for transmission of said ternary bits; and a receiver coupled to said transmitter over a communication channel for receiving said transmitted data, said receiver including second means for filtering out noise and co-channel interference from said communication channel, and means for decoding said transmitted data into a baseband data stream, said first and second filtering means being constructed and arranged to form a cascade pair for wave shape control of said transmitted data.

11. The communication system in claim 10 in which said first and second filtering means are a cascaded matched pair designed to cooperate to pass a step function while eliminating interference to or from other sources or users.

12. The communication system in claim 10 in which said first and second filtering means combine to form, in cascade, a combination filter having a predetermined transmission property for wave shaping said transmission.

13. The communication system in claim 12 in which said cascaded combination is a Bessel filter.

14. The communication system in claim 13 in which said Bessel filter is a even pole filter having one-half thereof at the transmitter and the other half at the receiver, each of said halves being identical.

15. A system for communicating electrical load control data comprising:

a transmitter for transmitting said data, said transmitter including a ternary character shift keying (TCSK) generator for encoding said data as a series of ternary bits and for transmitting a radio wave signal at a different frequency corresponding to each different state of said ternary bits; and a plurality of receivers each coupled to said transmitter over a different communication channel for receiving said transmitter data, each said receiver including an electrical load, means for controlling said electrical load, means for receiving and decoding said transmitted data into a baseband data stream in binary format, and microprocessor means coupled to said receiving and decoding means for receiving said baseband data in binary format and for developing a preamble to obtain a synchronization signal, an address identifier to provide a user enable function, and a data recognition command signal, thereby to direct said load controlling means to control said electrical load.

16. The communication system in claim 15 wherein said transmitter includes means for forming a truncate code and wherein each of said receivers includes means forming a response to said truncate code for shifting said receiver operation from an address message receive function to a command message receive function.

17. A system for communicating data comprising:

a transmitter for transmitting said data, said transmitter including a ternary character shift keying (TCSK) generator for encoding said data as a series of data chips, each said chip comprising four ternary bits, and for transmitting a different frequency for each different state of said ternary bits, one of said frequencies being a center frequency and the other frequencies being offset from said center frequency by an equal amount, said TCSK generator forming said data chips such that the net frequency of the transmitted ternary bits for each said data chip equals said center frequency; and a receiver coupled to said transmitter over a communication channel for receiving said transmitted data, said receiver including means for decoding said transmitted chips into a baseband data stream.

18. A method of communicating in a load management system including a master computer sending commands to a remote user, said method comprising the steps of:

generating load control commands;

translating said load control commands into a three level logic state system;

transmitting said translated load control commands via a frequency shift keying format wherein each state of said three level logic state system corresponds to a different frequency and the average frequency of all said commands equals the middle one of said different frequencies; and decoding said frequency shift keyed commands at said remote users.

19. The method of claim 18 wherein said transmitting step includes the step of modulating an SCA channel.

20. The method of claim 19 wherein said modulating step includes the step of modulating said SCA channel to prevent co-channel interference with another user of said SCA channel.

21. The method of claim 20 further including the steps of:

forming chips including four digits of said three level logic state system, and ensuring that the average frequency of each of said chips is said middle frequency.

22. A method of communicating in a load management system including a master computer sending commands to a remote user, said method including the steps of:

generating load control commands;

translating said load control commands into trinary chips, each chip being composed of four digits from a three level logic system; said levels being denoted by +, N, and −, using only chips having the same number of + digits as − digits;

frequency modulating a carrier frequency of an SCA channel according to said translated commands, wherein said + digit corresponds to a frequency $f_N+f$, said N digit corresponds to a frequency f, and said − digit corresponds to a frequency $f_N-f$; and decoding, at said remote user, said frequency modulated commands.

23. The method of claim 22 further including the steps of assigning a different hexadecimal digit to sixteen of said chips having the same number of + digits as − digits and assigning a different control character to each of the other chips having the same number of + digits as − digits.

* * * * *